United States Patent [19]
Hoshino

[11] Patent Number: 6,003,113
[45] Date of Patent: Dec. 14, 1999

[54] PORTABLE CARD MEDIUM, METHOD FOR MANAGING MEMORY SPACE OF PORTABLE CARD MEDIUM

[75] Inventor: Masao Hoshino, Kawasaki, Japan

[73] Assignee: Fujitsu Limited, Kawasaki, Japan

[21] Appl. No.: 09/048,092

[22] Filed: Mar. 26, 1998

[30] Foreign Application Priority Data

Oct. 9, 1997 [JP] Japan ................................ 9-277817

[51] Int. Cl.⁶ .................................................. G06F 12/16
[52] U.S. Cl. ........................................... 711/106; 235/492
[58] Field of Search ............................ 711/106; 235/492

[56] References Cited

U.S. PATENT DOCUMENTS 5,625,791  4/1997  Farrugia ................... 711/106

*Primary Examiner*—Harold I. Pitts
*Attorney, Agent, or Firm*—Nikaido, Marmelstein, Murray & Oram LLP

[57] ABSTRACT

In a portable card medium used for an IC card capable of realizing a plurality of application functions, the portable card medium includes an accepting mechanism to accept an application processing request from a host apparatus, an area control mechanism to extract an area of a memory for processing corresponding to the application processing request accepted by the accepting mechanism, and request the executing mechanism to perform the processing in the extracted area, and an area monitoring mechanism to take as input information of an area having access during program execution in the executing mechanism, and monitor whether or not the processing in the executing mechanism is performed in the area extracted by the area control mechanism, thereby preventing data to be managed by other application functions from being fetched.

17 Claims, 23 Drawing Sheets

FIG. 3
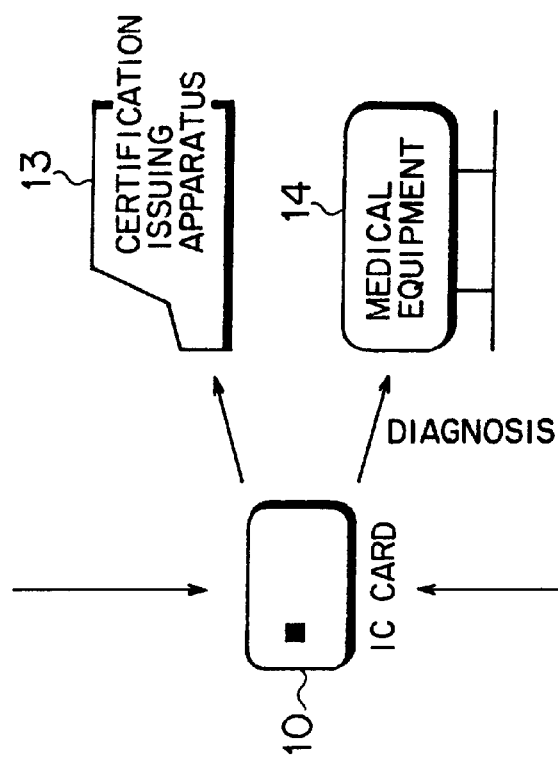
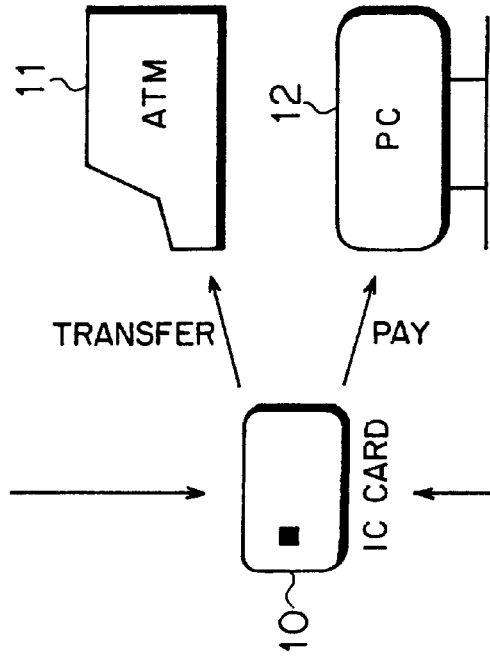

PORTABLE CARD MEDIUM, METHOD FOR MANAGING MEMORY SPACE OF PORTABLE CARD MEDIUM

BACKGROUND OF THE INVENTION (1) Field of the Invention

The present invention relates to a portable card medium suitable for use in an IC (Integrated Circuit) card which can realize a plurality of application functions, and to a method for managing a memory space of the portable card medium, a method for issuing the portable card medium, and a method for writing program data on the portable card medium. Further, the invention relates to a computer readable recording medium with a memory space management program recorded therein.

(2) Description of the Related Art

An IC card is a portable card medium including a built-in IC (Integrated Circuit) which can contain a larger amount of data than that of data in a conventional magnetic recording card, and is personally held for use in recording of personal information, and so forth. Thus, by connecting the IC card to a host apparatus, it is possible to realize application processing as an extension of processing in the magnetic recording card.

That is, as described above, in the IC card, it is possible to provide a greater storage capacity than that of the magnetic recording card, and enhance a security function of recorded personal information (the security function of protecting the personal information, and so forth).

Here, as shown in FIG. 23, an IC card 100 includes a CPU (Central Processing Unit) 101, a connect portion 102 having the function of interfacing with the outside of the card, and a memory 103 for data storage. For example, an erasable programmable read-only memory (EPROM) is used as the memory 103.

The CPU 101 includes a ROM (Read Only Memory) 101a containing a program for driving the CPU 101, a RAM (Random Access Memory) 101b containing data used for program execution, a control portion 101c to make a control such as various command processing according to the program recorded in the ROM 101a, and an operation part 101d to perform an operation on data.

In recent years, by using the IC card, active development has progressed on a system in which an electronic money is used instead of cash. Since various quarters have tried experiments on such an electronic money system, quick progression of the system has been made toward a practical stage.

Here, in the electronic money system, electronic money information equivalent to cash (information about an amount of money in user's hand) is transferred to the IC card held by a user through, for example, an automated teller machine (ATM) of a bank. When the user makes a payment by the money information, the information of paid money is transferred to a creditor. The system allows various types of commercial transactions to be made without delivery and receipt of cash and adoption of credit management.

Meanwhile, a commonly used type is the IC card 100 including only a single application function for the electronic money as described above. However, as the memory has a greater capacity and the CPU (Central Processing Unit) has a higher processing speed in the integrated circuit of the IC card in recent years, a study has been conducted of an IC card having a plurality of application functions.

Here, in the IC card in which only the single application function is available, a program for realizing the application function is previously written on hardware, i.e., the ROM 101a of the IC card 100.

On the other hand, the IC card may have the plurality of application functions (multi-application function) as described above. In this case, there is one method in which the user can load a program for realizing the application function such that the user can optionally select an application.

That is, before using the IC card, the user can individually write (load) the program for realizing the desired application function on the IC card, thereafter using the card as a multi-function IC card.

However, when the IC card is used as a portable card medium capable of realizing the plurality of application functions as stated above, the single memory 103 contains data to be processed and managed by the respective programs. Hence, data to be managed by one program may be accessible to and fetched by another program. In such a case, there is a problem in that it is difficult to provide sufficient security of the stored data.

SUMMARY OF THE INVENTION

In view of the foregoing problems, it is objects of the present invention to provide a portable card medium in which, in order to maintain a security function of stored data, an area for the operation of a CPU is restrictively preset in a memory at a time of execution of a program for realizing one application function, thereby preventing data to be managed by other application functions from being fetched, a method for managing a memory space of the portable card medium, a method for issuing the portable card medium, a method for writing program data on the portable card medium, and a computer readable recording medium with a memory space management program recorded therein.

According to the present invention, for achieving the above-mentioned objects, there is provided a portable card medium in which a memory contains a plurality of programs to be executed in response to various application processing requests from a host apparatus and data used for execution of the programs, and the respective programs are executed in an executing mechanism depending upon the stored programs and data, thereby processing a desired application processing request from the host apparatus. Further, the portable card medium includes an accepting mechanism to accept the application processing request from the host apparatus, an area control mechanism to extract an area of the memory for processing corresponding to the application processing request accepted by the accepting mechanism, and request the executing mechanism to perform the processing in the extracted area, and an area monitoring mechanism to take as input information of an area having access during the execution of the program in the executing mechanism, and monitor whether or not the processing in the executing mechanism is performed in the area extracted by the area control mechanism.

Thus, according to the present invention, it is possible to set, corresponding to the area of the memory, an access space for the operation of an access control, a command space for the operation of a command, and a supervisory control space for a supervisory control of processing in the access space and the command space. When the processing request from the host apparatus is accepted in the supervisory control space, the operation can be transferred from the supervisory control space to the access space or the command space such that the executing mechanism can process the processing request. Hence, in order to maintain the security function of the stored data, an area for the operation of the executing mechanism is restrictively preset in the memory at a time of execution of the program for realizing one application function. It is thereby possible to prevent data to be managed by other application functions from being fetched. As a result, it is possible to protect encryption algorithm/key/cryptographic processing unique to each application from falsification through other applications.

Further, according to the present invention, there is provided a method for managing a memory space of a portable card medium in which a memory contains a plurality of programs to be executed in response to various application processing requests from the host apparatus and data used for execution of the programs, and the programs are executed in the executing mechanism depending upon the stored programs and data, thereby processing a desired application processing request from the host apparatus. The method for managing the memory space of the portable card medium includes the steps of setting, corresponding to the area of the memory, the access space for storage of the data used by the application and for the operation of the access control in the program, the command space for the operation of the command used for processing other than the access control in the program, and the supervisory control space for the supervisory control of the processing in the access space and the command space, and transferring, when the processing request from the host apparatus is accepted in the supervisory control space, the operation from the supervisory control space to the access space or the command space such that the executing mechanism can process the processing request.

Consequently, according to the present invention, it is possible to set, corresponding to the area of the memory, the access space for the operation of the access control, the command space for the operation of the command, and the supervisory control space for the supervisory control of the processing in the access space and the command space. When the processing request from the host apparatus is accepted in the supervisory control space, the operation can be transferred from the supervisory control space to the access space or the command space such that the executing mechanism can process the processing request. Hence, in order to maintain the security function of the stored data, the area for the operation of the executing mechanism is restrictively preset in the memory at the time of execution of the program for realizing one application function. It is thereby possible to prevent the data to be managed by other application functions from being fetched. As a result, it is possible to protect the encryption algorithm/key/cryptographic processing unique to each application from falsification through other applications.

In addition, according to the present invention, there is provided a method for issuing a portable card medium in which a memory contains a plurality of programs to be executed in response to various application processing requests from the host apparatus and data used for execution of the programs, and the programs are executed in the executing mechanism depending upon the stored programs and data, thereby processing a desired application processing request from the host apparatus. When the portable card medium is issued, the method includes an authentication information posting step of posting authentication information inherent in the host apparatus capable of issuing the card medium to an external card medium containing authentication information, a collation decision step of, in the external card medium, collating for authentication the authentication information posted in the authentication information posting step with the authentication information stored in the external card medium, and deciding whether or not the card medium can be issued through the host apparatus, and an issuing step of issuing the desired card medium through the host apparatus when it is decided that the card medium can be issued as a result of decision in the collation decision step.

Consequently, according to the present invention, the method includes the authentication information posting step, the collation decision step, and the issuing step. Since the authentication information is set when the portable card medium is manufactured, there is an advantage in that, for example, falsification of the medium can be avoided for a period from the manufacture to the issue of the card. In addition, since the authentication is performed based upon the external apparatus, there is another advantage in that, for example, an important program can be written by only an application manager, and so forth.

Further, according to the present invention, there is provided a method for writing program data on a portable card medium in which a memory contains a plurality of programs to be executed in response to various application processing requests from the host apparatus and data used for execution of the programs, and the programs are executed in the executing mechanism depending upon the stored programs and data, thereby processing the desired application processing request from the host apparatus. When an external apparatus writes the program data on the memory of the portable card medium, the method includes an authentication information posting step of posting authentication information of the external apparatus to the card medium and posting authentication information of the card medium to the external apparatus, a collation decision step of, in the external apparatus, collating for authentication the authentication information posted from the card medium with the authentication information stored in the external apparatus, and, in the card medium, collating for authentication the authentication information posted from the external apparatus with the authentication information stored in the card medium, and deciding whether a write operation of the program data by the external apparatus is to be enabled or disabled, and a write operation step of, in the card medium, performing the write operation through the external apparatus when it is decided that the program data can be written as a result of decision in the collation decision step.

Consequently, according to the present invention, the method includes the authentication information posting step, the collation decision step, and the write operation step. Since the authentication information is set when the portable card medium is manufactured, there is an advantage in that, for example, falsification of the medium can be avoided for a period from the manufacture to the issue of the card. In addition, since the authentication is performed based upon the external apparatus, there is another advantage in that, for example, an important program can be written by only an application manager, and so forth.

Further, there is provided a computer readable recording medium with a memory space management program recorded therein according to the present invention. In a computer, a memory contains a plurality of programs to be executed in response to various application processing requests from a host apparatus and data used for execution of the programs, and the programs are executed in an executing mechanism depending upon the stored programs and data, thereby processing the desired application processing request from the host apparatus. When a memory space is managed in the computer, the memory space management program causes the computer to realize a space setting function of setting in an area of the memory an access space for storage of data used by the application and for the operation of an access control in the program, a command space for the operation of a command for processing other than the access control in the program, and a supervisory control space for a supervisory control of processing in the access space and the command space, and a space control function of transferring, when a processing request from the host apparatus is accepted in the supervisory control space, the operation from the supervisory control space to the access space or the command space such that the executing mechanism can process the processing request.

Consequently, according to the present invention, it is possible to set, corresponding to the area of the memory, the access space for the operation of the access control, the command space for the operation of the command, and the supervisory control space for the supervisory control of the processing in the access space and the command space. When the processing request from the host apparatus is accepted in the supervisory control space, the operation can be transferred from the supervisory control space to the access space or the command space such that the executing mechanism can process the processing request. Hence, in order to maintain a security function of the stored data, the area for the operation of the executing mechanism is restrictively preset in the memory at the time of execution of the program for realizing one application function. It is thereby possible to prevent the data to be managed by other application functions from being fetched. As a result, it is possible to protect the encryption algorithm/key/cryptographic processing unique to each application from falsification through other applications.

BRIEF DESCRIPTION OF THE DRAWINGS

FIG. 3 is a diagram showing connections between host apparatuses and the IC card for realizing various application systems according to the embodiment;

DESCRIPTION OF THE PREFERRED EMBODIMENTS (a) Description of Aspect of the Invention A description will now be given of an aspect of the present invention referring to the accompanying drawings.

Figure 1:
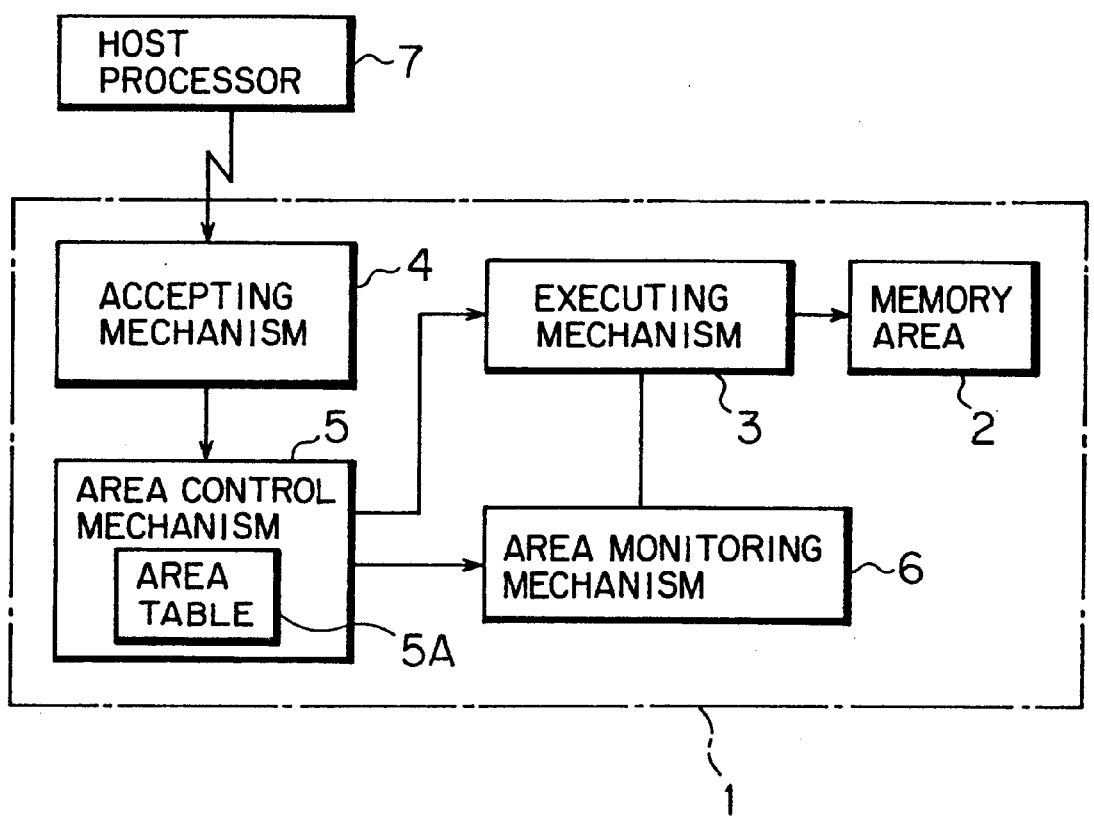
FIG. 1 is a block diagram showing an aspect of the present invention.

FIG. 1 is a block diagram showing the aspect of the present invention. In FIG. 1, reference numeral 1 denotes a portable card medium. In the portable card medium 1, a memory area 2 contains a plurality of programs to be executed in response to various application processing requests from a host apparatus 7 and data used for execution of the programs. Further, the respective programs are executed by an executing mechanism 3 depending upon the stored programs and data. It is thereby possible to process a desired application processing request from the host apparatus 7. The portable card medium includes an accepting mechanism 4, an area control mechanism 5, and an area monitoring mechanism 6.

Here, the accepting mechanism 4 accepts the application processing request from the host apparatus 7, and the area control mechanism 5 extracts an area of the memory 2 for processing corresponding to the application processing request accepted by the accepting mechanism 4, and requests the executing mechanism 3 to perform the processing in the extracted area.

Further, the area monitoring mechanism 6 takes as input information of an area having access during execution of the program in the executing mechanism 3 so as to monitor whether or not the processing in the executing mechanism 3 is performed in the area extracted by the area control mechanism 5 (claim 1), and includes an area table 5A.

Here, the area table 5A previously contains area information used for the processing in the executing mechanism 3 according to the type of application processing. The area control mechanism 5 refers to the area table 5A according to the type of application processing request accepted by the accepting mechanism 4, thereby extracting the area of the memory 2 for the processing corresponding to the application processing request.

Further, the area table 5A can be configured to set an area corresponding to an access space for storage of data used for the application accepted by the accepting mechanism 4 and for the operation of an access control in the program, and an area corresponding to a command space for the operation of a command used for processing other than the access control in the program.

Alternatively, the area control mechanism 5 may be provided to extract the area of the memory 2 for the processing corresponding to the application processing request accepted by the accepting mechanism 4 depending upon address information or page information by referring to the area table 5A.

Further, the area monitoring mechanism 6 may include a register portion containing the area of the memory 2 extracted by the area control mechanism 5, and may be configured to monitor whether or not the processing is performed in the executing mechanism depending upon the information contained in the register portion.

Additionally, the area table 5A may contain, for each type of the application processing request from the host apparatus 7, authentication information used to decide whether or not the application processing request can be accepted.

Besides, the area control mechanism 5 may store, in the area table 5A, identification information used for identification of the application processing, and contained in the preceding application processing request accepted by the accepting mechanism 4.

Thus, according to the present invention, there are provided the accepting mechanism 4, the area control mechanism 5, and the area monitoring mechanism 6. It is possible to set, corresponding to the area 2 of the memory, the access space for the operation of the access control, the command space for the operation of the command, and a supervisory control space for a supervisory control of processing in the access space and the command space. When the processing request from the host apparatus is accepted in the supervisory control space, the operation can be transferred from the supervisory control space to the access space or the command space such that the executing mechanism 3 can process the processing request. In order to maintain a security function of the stored data, an area for the operation of the executing mechanism 3 is restrictively preset in the memory at a time of execution of the program for realizing one application function. It is thereby possible to prevent data to be managed by other application functions from being fetched. As a result, it is possible to protect encryption algorithm/key/cryptographic processing unique to each application from falsification through other applications.

Further, in a method for managing the memory space of the portable card medium of the present invention, the memory contains the plurality of programs to be executed in response to the various application processing requests from the host apparatus and the data used for execution of the programs, and the programs are executed in the executing mechanism depending upon the stored programs and data, thereby processing the desired application processing request from the host apparatus. In the method for managing the memory space of the portable card medium, the method includes the steps of setting, corresponding to the area of the memory, the access space for storage of the data used by the application and for the operation of the access control in the program, the command space for the operation of the command used for processing other than the access control in the program, and the supervisory control space for the supervisory control of the processing in the access space and the command space, and transferring, when the processing request from the host apparatus is accepted in the supervisory control space, the operation from the supervisory control space to the access space or the command space such that the executing mechanism can process the processing request.

Consequently, according to the present invention, it is possible to set, corresponding to the area of the memory, the access space for the operation of the access control, the command space for the operation of the command, and the supervisory control space for the supervisory control of the processing in the access space and the command space. When the processing request from the host apparatus is accepted in the supervisory control space, the operation can be transferred from the supervisory control space to the access space or the command space such that the executing mechanism can process the processing request. In order to maintain the security function of the stored data, the area for the operation of the executing mechanism is restrictively preset in the memory at the time of execution of the program for realizing one application function. It is thereby possible to prevent the data to be managed by other application functions from being fetched. As a result, it is possible to protect the encryption algorithm/key/cryptographic processing unique to each application from falsification through other applications.

In this case, for the plurality of application processing, the memory can contain the programs for the plurality of application processing and the data used for execution of the programs, while the access space and the command space can be set for each application.

Further, in a method for managing the memory space of the memory medium, an area for accessible data and an area for a program allowing the access control can be set in the access space according to division for each of the applications. In this case, it is possible to define a part of the access space set according to the division for each of the applications as a mutually shared space.

Consequently, it is possible to partially define, as the mutually shared space, the access space set according to the division for each of the applications or the command space in which the command execution is enabled. As a result, there are advantages in that a space sharing control can be realized between the access space and the command space, and the memory area can effectively be used.

A program area in which command execution is enabled can be set in the command space according to division in application units. Further, apart of the command space set according to division for each of the applications may be defined as the mutually shared space.

Consequently, it is possible to partially define, as the mutually shared space, the access space set according to the division for each of the applications or the command space in which the command execution is enabled. As a result, there are advantages in that a space sharing control can be realized between the access space and the command space, and the memory area can effectively be used.

Further, it is possible to extend the command space depending upon a declaration made to the supervisory control space while the command space is active.

Consequently, according to the present invention, it is possible to extend the command space depending upon the declaration made to the supervisory control space while the command space is active. Hence, for example, at a time of collation of authentication information, it is also possible to provide security (black box) in a part of the same application as long as an area which can not be written by a user other than authenticated program developers is set as an extended area serving as the black box. Thus, it is possible to avoid falsification of the program, and avoid falsification of an encryption algorithm, a key, or cryptographic processing for the collation of the authentication information.

In addition, in a portable card medium of the present invention, a memory contains a plurality of programs to be executed in response to various application processing requests from the host apparatus and data used for execution of the programs, and the programs are executed in the executing mechanism depending upon the stored programs and data, thereby processing a desired application processing request from the host apparatus. When the portable card medium is issued, a method for issuing the portable card medium according to the present invention includes an authentication information posting step of posting authentication information inherent in the host apparatus capable of issuing the card medium to an external card medium containing authentication information, a collation decision step of, in the external card medium, collating for authentication the authentication information posted in the authentication information posting step with the authentication information stored in the external card medium, and deciding whether or not the card medium can be issued through the host apparatus, and an issuing step of issuing the desired card medium through the host apparatus when it is decided that the card medium can be issued as a result of decision in the collation decision step, thereby issuing the portable card medium in which the desired application processing request from the host apparatus can be processed.

Consequently, according to the present invention, the method includes the authentication information posting step, the collation decision step, and the issuing step. Since the authentication information is set when the portable card medium is manufactured, there is an advantage in that, for example, falsification of the medium can be avoided for a period from the manufacture to the issue of the card. In addition, since the authentication is performed based upon the external apparatus, there is another advantage in that, for example, an important program can be written by only an application manager, and so forth.

Further, in a portable card medium, a memory contains a plurality of programs to be executed in response to various application processing requests from the host apparatus and data used for execution of the programs, and the programs are executed in the executing mechanism depending upon the stored programs and data, thereby processing the desired application processing request from the host apparatus. When an external apparatus writes program data on the memory of the portable card medium, a method for writing the program data on the portable card medium according to the present invention includes an authentication information posting step of posting authentication information of the external apparatus to the card medium and posting authentication information of the card medium to the external apparatus, a collation decision step of, in the external apparatus, collating for authentication the authentication information posted from the card medium with the authentication information stored in the external apparatus, and, in the card medium, collating for authentication the authentication information posted from the external apparatus with the authentication information stored in the card medium, thereby deciding whether a write operation of the program data by the external apparatus is to be enabled or disabled, and a write operation step of, in the card medium, performing the write operation through the external apparatus when it is decided that the program data can be written as a result of decision in the collation decision step.

Consequently, according to the present invention, the method includes the authentication information posting step, the collation decision step, and the write operation step. Since the authentication information is set when the portable card medium is manufactured, there is an advantage in that, for example, falsification of the medium can be avoided for a period from the manufacture to the issue of the card. In addition, since the authentication is performed based upon the external apparatus, there is another advantage in that, for example, an important program can be written by only an application manager, and so forth.

Further, in a computer, a memory contains a plurality of programs to be executed in response to various application processing requests from a host apparatus, and data used for execution of the programs, and the programs are executed in the executing mechanism depending upon the stored programs and data, thereby processing the desired application processing request from the host apparatus. In a computer readable recording medium with a memory space management program recorded therein according to the present invention, when a memory space is managed in the computer, the memory space management program causes the computer to realize a space setting function of setting in an area of the memory an access space for storage of data used by the application and for the operation of an access control in the program, a command space for the operation of a command for processing other than the access control in the program, and a supervisory control space for a supervisory control of processing in the access space and the command space, and a space control function of transferring, when a processing request from the host apparatus is accepted in the supervisory control space, the operation from the supervisory control space to the access space or the command space such that the executing mechanism can process the processing request.

Consequently, according to the present invention, it is possible to set, corresponding to the area of the memory, the access space for the operation of the access control, the command space for the operation of the command, and the supervisory control space for the supervisory control of the processing in the access space and the command space. When the processing request from the host apparatus is accepted in the supervisory control space, the operation can be transferred from the supervisory control space to the access space or the command space such that the executing mechanism can process the processing request. In order to maintain the security function of the stored data, the area for the operation of the executing mechanism is restrictively preset in the memory at the time of execution of the program for realizing one application function. It is thereby possible to prevent the data to be managed by other application functions from being fetched. As a result, it is possible to protect the encryption algorithm/key/cryptographic processing unique to each application from falsification through other applications.

(b) Description of Schematic Configuration and Applicable Mode of IC Card According to the Embodiment A description will now be given of an embodiment of the present invention referring to the accompanying drawings.

First, a description will be given of a schematic configuration of an IC card according to the 44 embodiment, and an applicable mode of the IC card.

Figure 2:
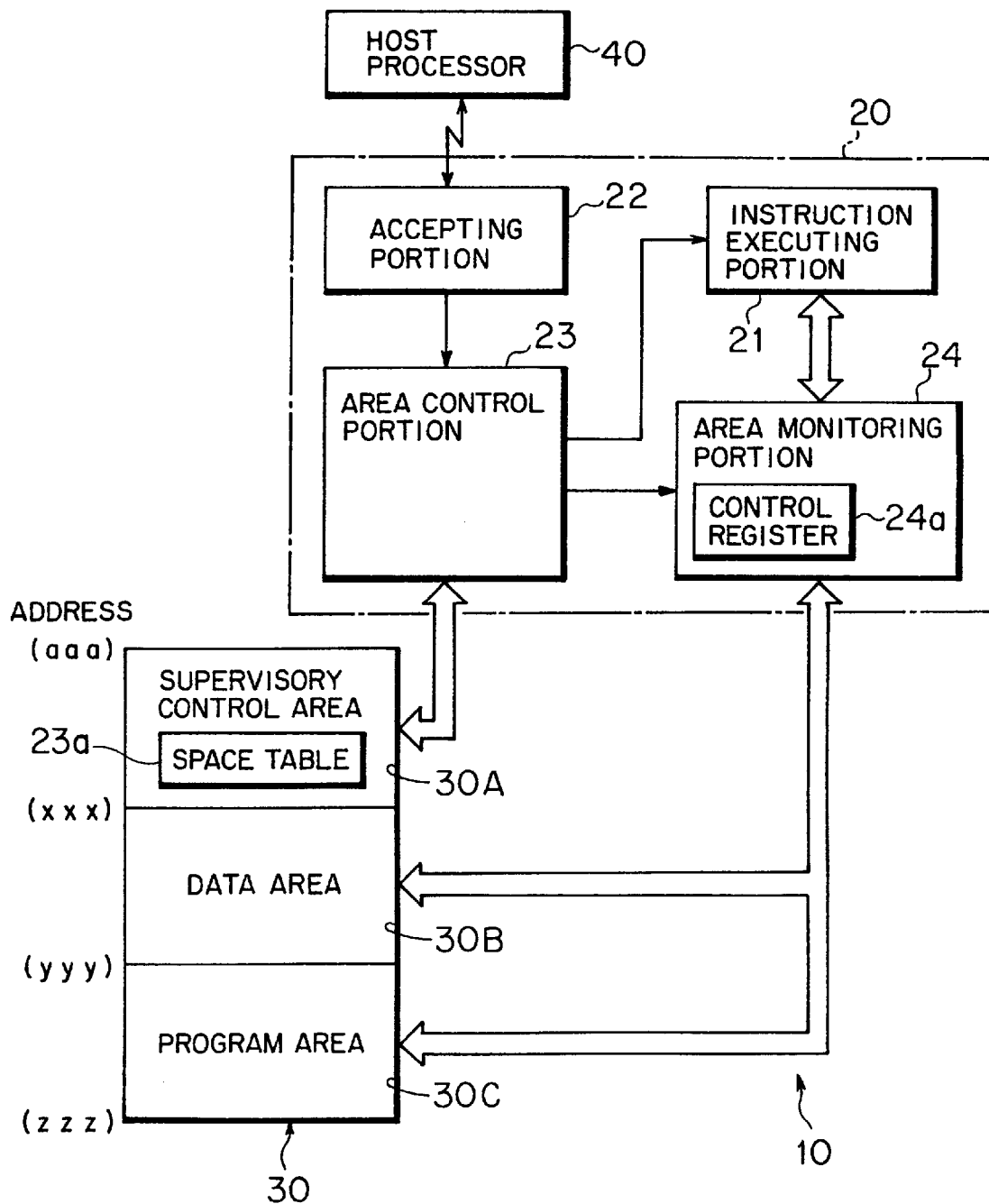
FIG. 2 is a block diagram showing an IC card according to one embodiment of the present invention.

FIG. 2 is a block diagram showing an IC (Integrated Circuit) card according to one embodiment of the present invention. As described above, the IC card 10 shown in FIG. 2 forms a portable card medium having portability or transportability and including a built-in integrated circuit in which a large amount of data can be stored, and can be shared to realize, for example, a plurality of applications.

That is, in the IC card 10 according to the embodiment, as shown in FIG. 3, the same card can be connected to different types of host apparatuses in application systems for an electronic money, medical information, and so forth. It is thereby possible to construct a so-called multi-application system in which the various types of applications can be realized.

Here, as shown in FIG. 2, the IC card 10 according to the embodiment includes, in view of hardware, a CPU (Central Processing Unit) 20, a memory 30 for data storage, and an unillustrated connect portion having the function of interfacing with the outside of the card.

The memory 30 contains a plurality of programs to be executed in the CPU 20 in response to various application processing requests from a host apparatus 40, and data used for execution of the programs. In the programs for the various application processing stored in the memory 30, it is to be noted that the programs may previously be stored in a read-only memory when the card is manufactured, or the programs may later be loaded into a writable memory according to user's purposes.

Further, an area of the memory 30 is divided according to attributes of stored data into three areas: a supervisory control area 30A, a data area 30B, and a program area 30C.

Meanwhile, the programs stored in the IC card 10 are operated in response to the processing request from the host apparatus 40 connected to the unillustrated connect portion, thereby allowing the IC card 10 to realize various application operations. Moreover, the application operations can also be realized while the program stored in the IC card 10 is executed in cooperation with a program stored in the host apparatus 40.

As shown in FIG. 3, it is thereby possible to perform issue processing for the IC card 10 (card issue processing) through card issuing apparatus 15, 16 for, for example, loading processing of software for the plurality of applications such as electronic money application, and medical information application, and storage of authentication information held by a user and described infra. Further, the issued IC card in common can be applied to the plurality of application systems.

Here, as stated above, in a mode of using the IC card 10 in an electronic money application system, the IC card 10 issued by the card issuing apparatus can be connected to, for example, an automated teller machine (ATM) 11 of a bank. It is thereby possible to store in the IC card 10 electronic money information equivalent to cash (information about an amount of money in user's hand), or transfer the electronic money information to a bank account. In addition, it is possible to use money information transferred to the IC card 10 so as to electronically make a payment through a terminal 12 such as personal computer (PC) or POS (Point Of Sales).

That is, according to the electronic money application system, information of money paid for merchandise can be converted into electronic information, and the electronic information can be transferred to a creditor through the IC card 10 and the terminal 12. It is thereby possible to make various types of actual commercial transactions without delivery and receipt of cash and adoption of credit management.

Further, in the medical information application system, for example, when a user goes to a hospital for medical examination, diagnostic information through medical equipment 14 such as electrocardiograph (a result of measurement in the case of electrocardiography) can electronically be recorded in the IC card 10 issued by the card issuing apparatus 16. It is thereby possible to issue a medical certificate through the medical equipment 14 by connecting the IC card 10 to a certificate issuing apparatus 13 as required.

(c) Description of Function of IC Card According to the Embodiment

Meanwhile, according to the embodiment, the IC card in common can be applied to the plurality of application systems as stated above. However, in order to prevent data to be managed by one application from being fetched by another application, an area of the memory for the operation of the CPU 20 is restrictively set according to an operating state thereof.

Hence, as shown in FIG. 2, the IC card 10 according to the embodiment includes an instruction executing portion 21, an accepting portion 22, an area control portion 23, and an area monitoring portion 24. Moreover, the functions as the instruction executing portion 21, the accepting portion 22, the area control portion 23, and the area monitoring portion 24 are realized by appropriately using hardware and software resources in the IC card 10. In other words, the functions given by these function parts are realized by the operation of the program stored in the memory 30 through, for example, the CPU 20 having access to the memory 30.

Alternatively, the program (memory space management program) for realizing the functions (see reference numerals 21 to 24) may be loaded from a recording medium such as CD-ROM.

Here, the instruction executing portion 21 includes the CPU 20 in view of hardware, and executes the programs depending upon the programs and data stored in the memory 30 for the various application processing, thereby processing a desired application processing request from the host apparatus 40, resulting in serving as an executing mechanism.

Further, the accepting portion 22 accepts an application processing request from the host apparatus 40 connected through the unillustrated connect portion, thereby providing the function as an accepting mechanism.

Additionally, the area control portion 23 extracts an area of the memory 30 for processing corresponding to the application processing request accepted by the accepting portion 22, and requests the instruction executing portion 21 to perform the processing in the extracted area, thereby providing the function as an area control mechanism.

That is, the supervisory control area 30A includes a space table (area table) 23$a$ previously containing area information used for the processing in the instruction executing portion 21 according to the type of application processing.

In other words, information related to the space table 23$a$ is stored in the supervisory control area 30A of the memory 30. That is, the CPU 20 reads the information related to the space table 23$a$ in the area 30A, thereby realizing the function as the area control portion 23.

Figure 9:
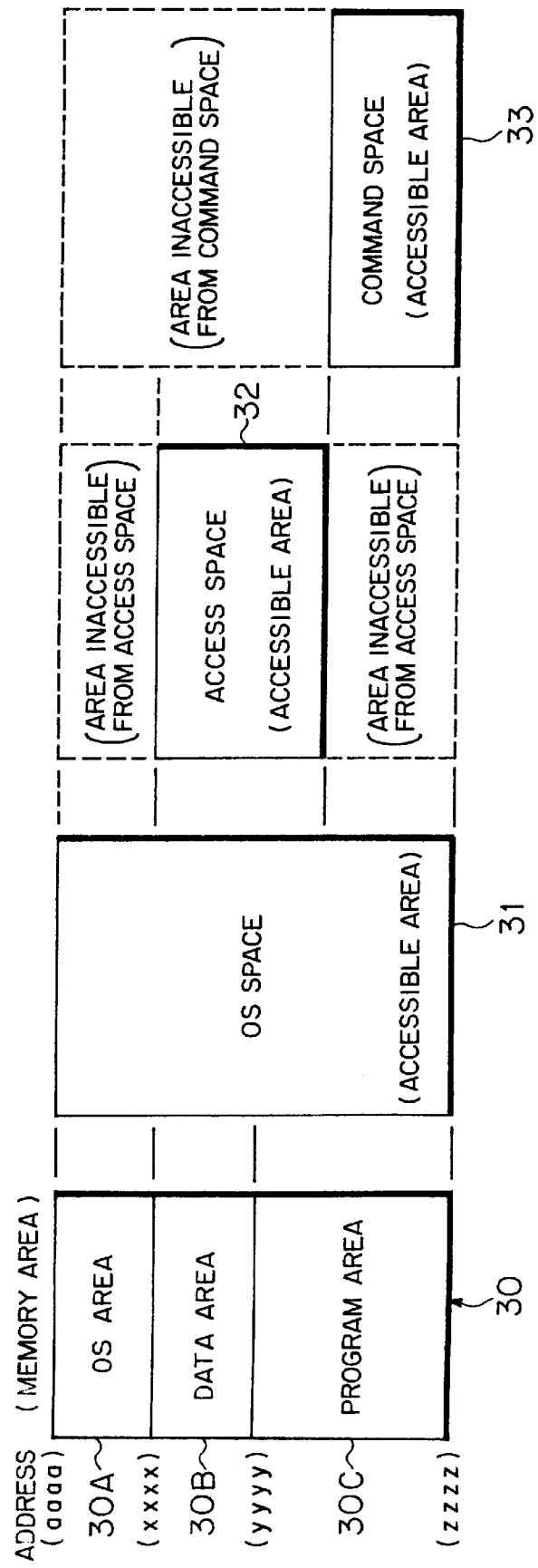

Here, as shown in FIG. 9 in the following discussion, the space table 23$a$ includes an access space 32 set for the operation of an access control in the program for the application processing accepted by the accepting portion 22, and a command space 33 set for the operation of a command for performing processing other than the access control in the program.

Figure 10:
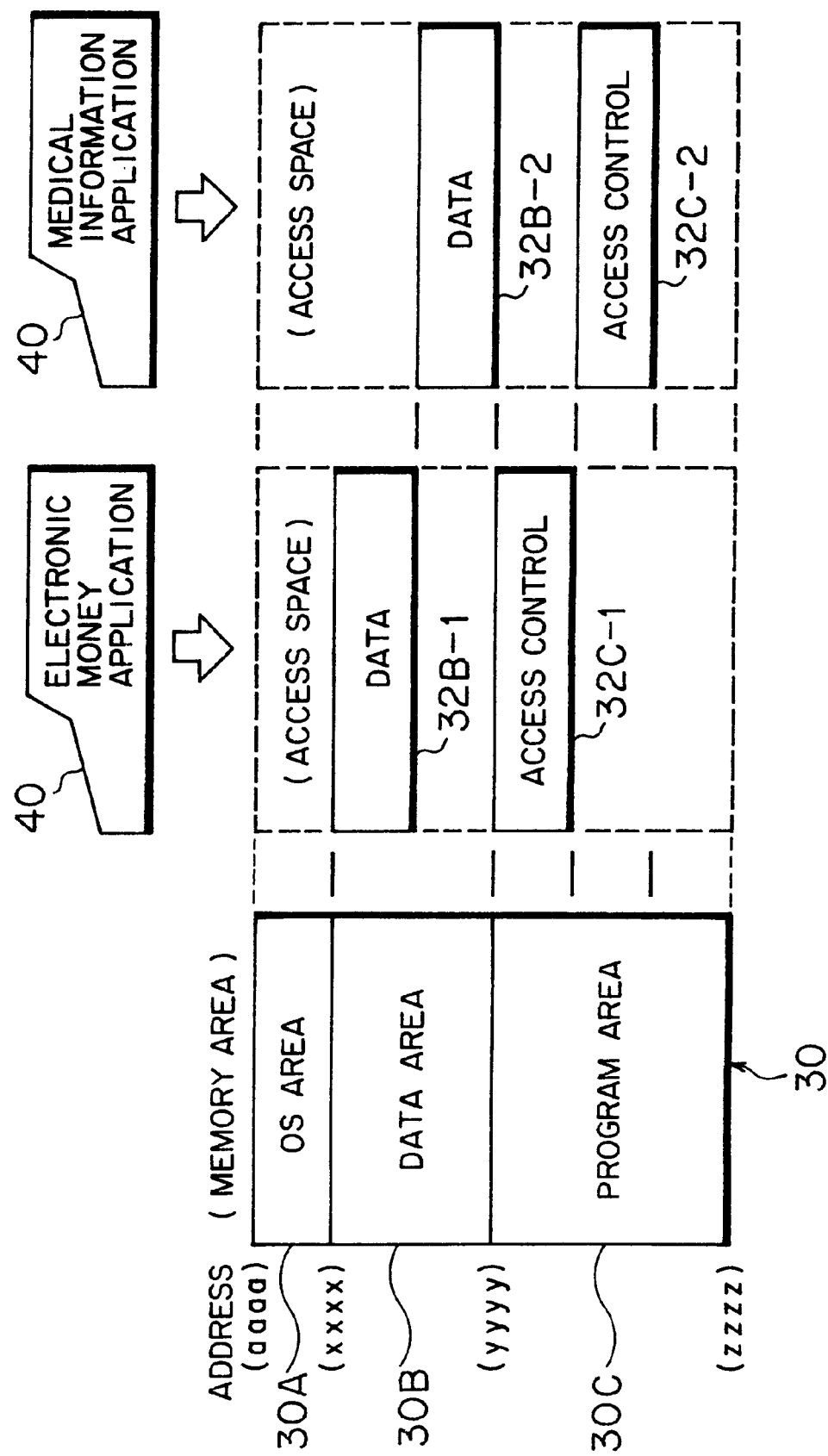
FIG. 10 is a diagram showing the access spaces serving as the operating area of the CPU 20 in the embodiment.

That is, as shown in FIG. 10 in the following discussion, for each type of application, there are set, in the space table 23$a$, data 32B-1, 32B-2 used by the applications accepted by the accepting portion 22, and, as an access space, areas 32C-1, 32C-2 of the memory 30 containing a program for making an access control during the application processing.

Figure 11:
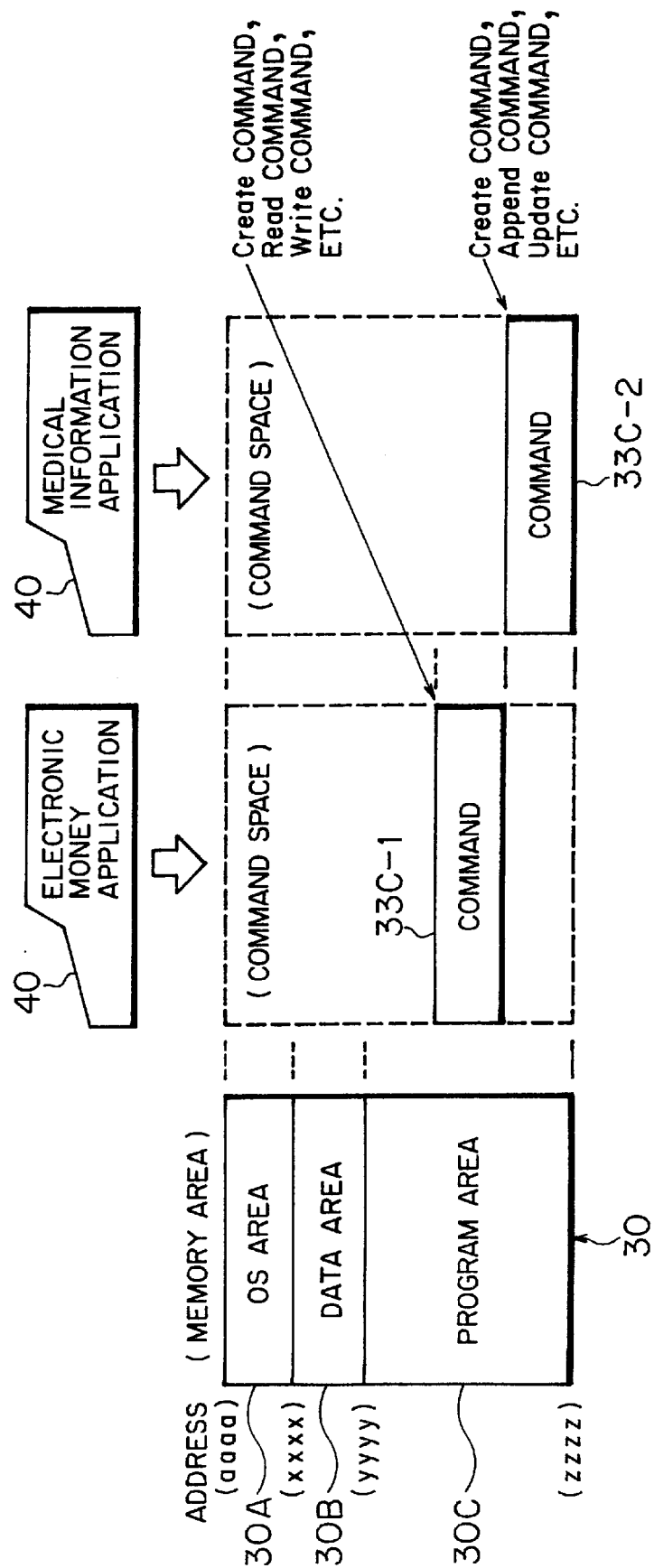
FIGS. 11 and 12 are diagrams respectively showing the command spaces serving as the operating area of the CPU 20 in the embodiment.

Further, as shown in FIG. 11 in the following discussion, for each type of application, there are set, as a command space in the space table 23$a$, areas 33C-1, 33C-2 of the memory 30 containing commands for processing other than the access control in the application processing, such as a command (issue command) for creating data, and a command for processing a processing request from the application in the host apparatus 40.

The area control portion 23 can thereby extract the area of the memory 30 for the processing corresponding to the application processing request from the host apparatus 40 depending upon the type of the application processing request accepted by the accepting portion 22 by referring to the space table 23a described above.

Moreover, the area control portion 23 sets the extracted area information in a control register 24a of the area monitoring portion 24 at a subsequent stage, thereafter posting the extracted area information of the memory 30 to the instruction executing portion 21, thereby requesting the instruction executing portion 21 to perform processing according to a program stored in the area information.

Besides, the area monitoring portion 24 takes as input information of an area having access to the memory 30 during the execution of the above program in the instruction executing portion 21, and monitors whether or not the processing in the instruction executing portion 21 is being performed in the area extracted by the area control portion 23, thereby providing the function as an area monitoring mechanism.

Specifically, the area monitoring portion 24 includes the control register 24a in which the area information extracted in the area control portion 23 is set as hardware information, and decides whether the instruction executing portion 21 has access to the memory at an address identical with or different from an address (or page) in the area information set in the control register 24a.

In other words, the control register 24a functions as a register portion containing the area of the memory 30 extracted by the area control portion 23. The area control portion 24 can monitor, depending upon the information stored in the control register 24a, whether or not the processing in the instruction executing portion 21 is being performed, that is, whether or not the processing in the instruction executing portion 21 is being performed in the area extracted by the area control portion 23.

(d) Description of Operating Space of IC Card According to the Embodiment

A description will now be given of an operating space of the IC card 10 according to the embodiment.

As stated above, in the IC card 10 according to the embodiment, the area of the memory 30 is divided according to the attributes of stored data into the three areas: the supervisory control area 30A, the data area 30B, and the program area 30C.

Figure 4:
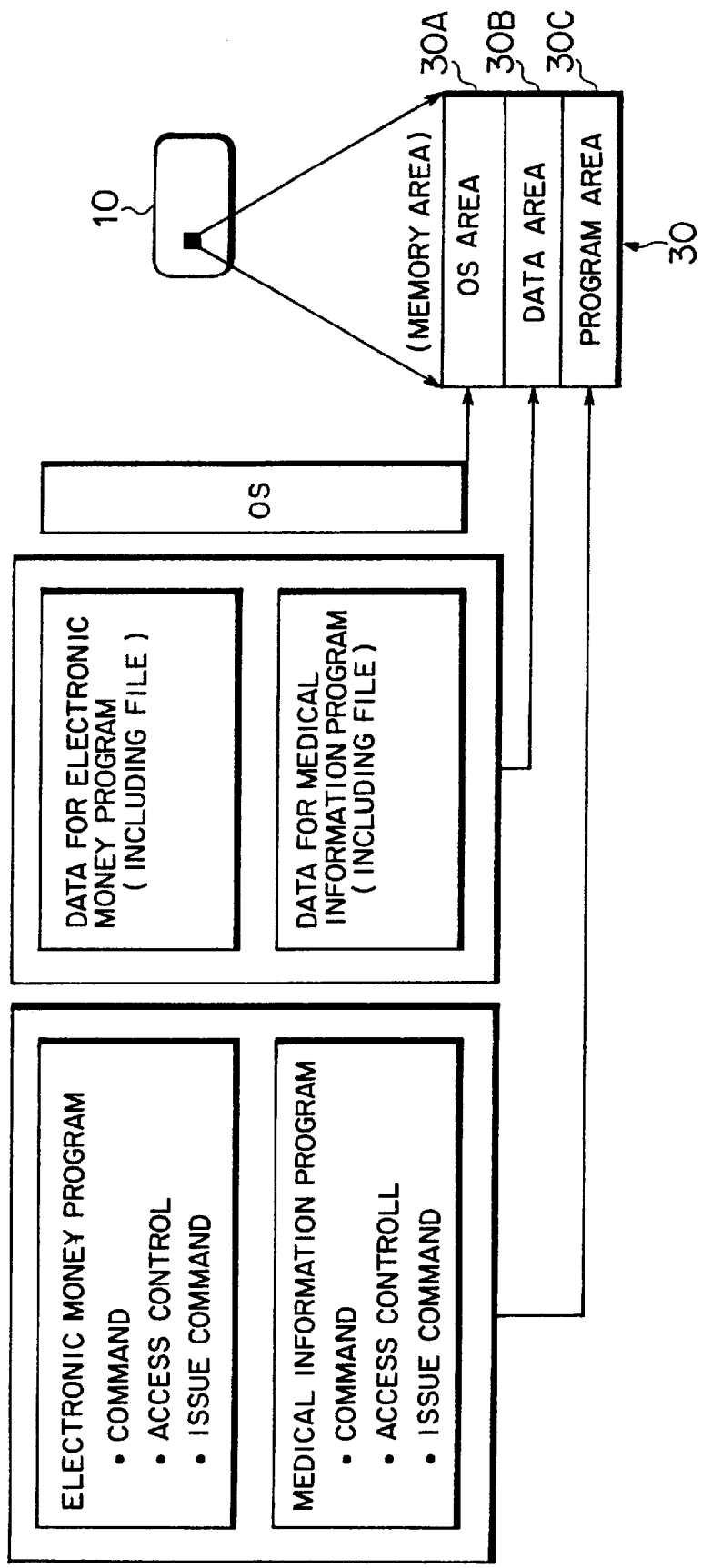
FIG. 4 is a diagram for explaining areas containing program and data for each application in the embodiment.

The data area 30B and the program area 30C contain data and a program for each application. Specifically, as shown in FIG. 4, the data area 30B contains data (including a file) used for the electronic money application program, and data (including a file) used for the medical information application program. The data area 30C contains the electronic money application program, and the medical information application program.

Moreover, the programs for the applications respectively include command information requested by the host apparatus 40, access control information for access to data in the memory 30, issue command information for creation of data, and various types of data.

Here, the supervisory control area 30A serving as a supervisory control area contains an OS (Operating System) serving as a program for, according to the type of application, supervisory monitoring/control of the operating areas (the areas 30B, 30C to which the CPU 20 has access) used for the respective applications.

Further, the CPU 20 has access to a predetermined area of the memory 30 as required, thereby realizing desired application processing. Operating areas corresponding to execution modes of the CPU 20 can be set as the three types of spaces corresponding to the areas of the memory 30.

Figure 8:
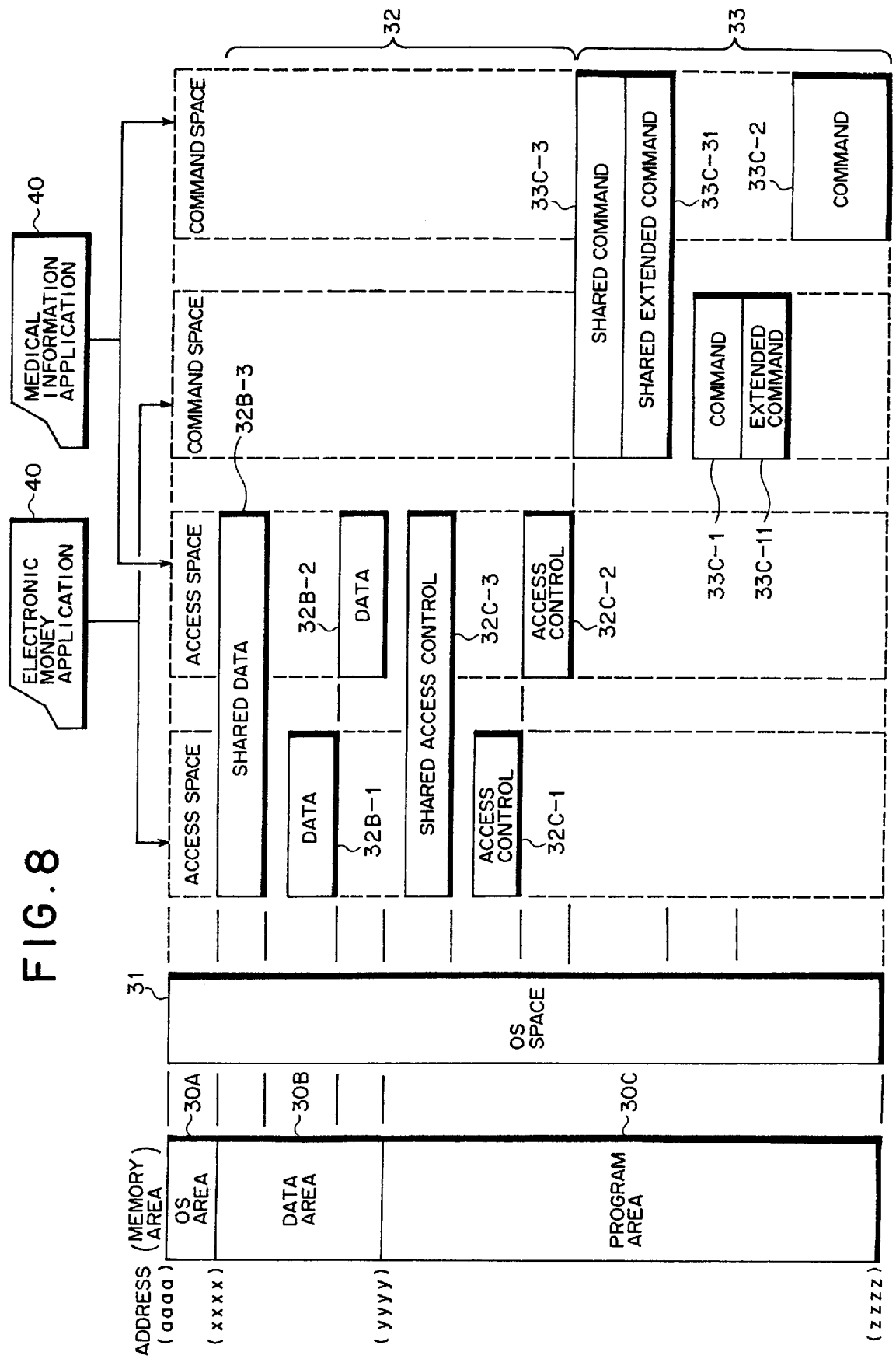
FIGS. 8 and 9 are diagrams respectively showing an OS space, an access space, and a command space serving as an operating area of a CPU 20 in the embodiment.

Specifically, as shown in FIG. 8 or 9, the operating areas of the CPU 20 can be set as an OS space 31, the access space 32, and the command space 33 corresponding to the areas of the memory 30.

Here, the access space 32 shows an active area of the memory 30 during the access control by the CPU 20. That is, the access space 32 contains the data used for the respective applications, and the access control information for the respective application programs. The access space 32 corresponds to an area, equivalent to an access control program, forming the data area 30B and the program area 30C of the memory 30.

Further, the command space 33 shows an area of the memory 30 for the operation of commands (including the issue command for creating data) other than the access control in the respective programs, such as "Create," "Read," and "Write." That is, the command space 33 contains command information other than the access control program in the program area 30C.

Thus, during the program execution by the CPU 20, command execution is carried out in the command space 33, and the access control is made in the access space 32. However, the operations in the access space 32 and the command space 33 are monitored/controlled in the OS space 31.

That is, the OS space 31 shows an accessible area of the memory 30 when the CPU 20 is in an operating state according to the program (the OS, see the functions shown by reference numerals 21 to 24 in FIG. 2) stored in the supervisory control area 30A described above. The OS space 31 includes all the areas of the memory 30.

That is, when the program stored in the supervisory control area 30A is running, the CPU 20 has access to the supervisory control area 30A, the data area 30B, and the program area 30C in the OS space 31.

In other words, the OS space 31 is a space for supervisory monitoring/control of the processing in the access space 32 and the command space 33, thereby functioning as a supervisory control space.

Specifically, as will be described infra, when an application processing request from the host apparatus 40 is accepted in the OS space 31, the operation can be transferred from the OS space 31 to the access space 32 or the command space 33 according to the type of application and the corresponding program.

In other words, in the active state of the OS space 31, the accessible area of the memory 30 can restrictively be set depending upon the application processing request from the host apparatus 40, while the control can be transferred to execute the corresponding program.

Meanwhile, the programs and the data for realizing the two applications described above are respectively stored in the different areas of the memory 30.

Thus, the memory 30 contains the plurality of application processing programs and the data for execution of the plurality of application processing programs in order to perform the plurality of application processing, while the memory can be managed by setting the access space 32 and the command space 33 for each application.

Further, in the access space 32, it is possible to set according to division for each application an accessible data area and a program area in which the access control can be made. In the command space 33, it is possible to set according to division for each application a program area in which command execution is enabled.

Specifically, as shown in FIG. 10, two sets of data and access control information are stored in areas having different addresses of the memory 30 corresponding to the access space 32. That is, in the electronic money application, the access space includes the area 32B-1 in the first half of the data area 30B and the area 32C-1 in the first half of the program area 30C.

Similarly, in the medical information application, the access space includes the area 32B-2 in the latter half of the data area 30B and the area 32C-2 subsequent to the area 32C-1 of the program area 30C.

Further, as shown in FIG. 11, two sets of programs are respectively stored in areas having different addresses of the memory 30 corresponding to the command space 33. That is, in the electronic money application, the command space includes the area 33C-1 of the program area 30C. In the medical information application, the command space includes the area 33C-2 of the program area 30C.

Figure 12:
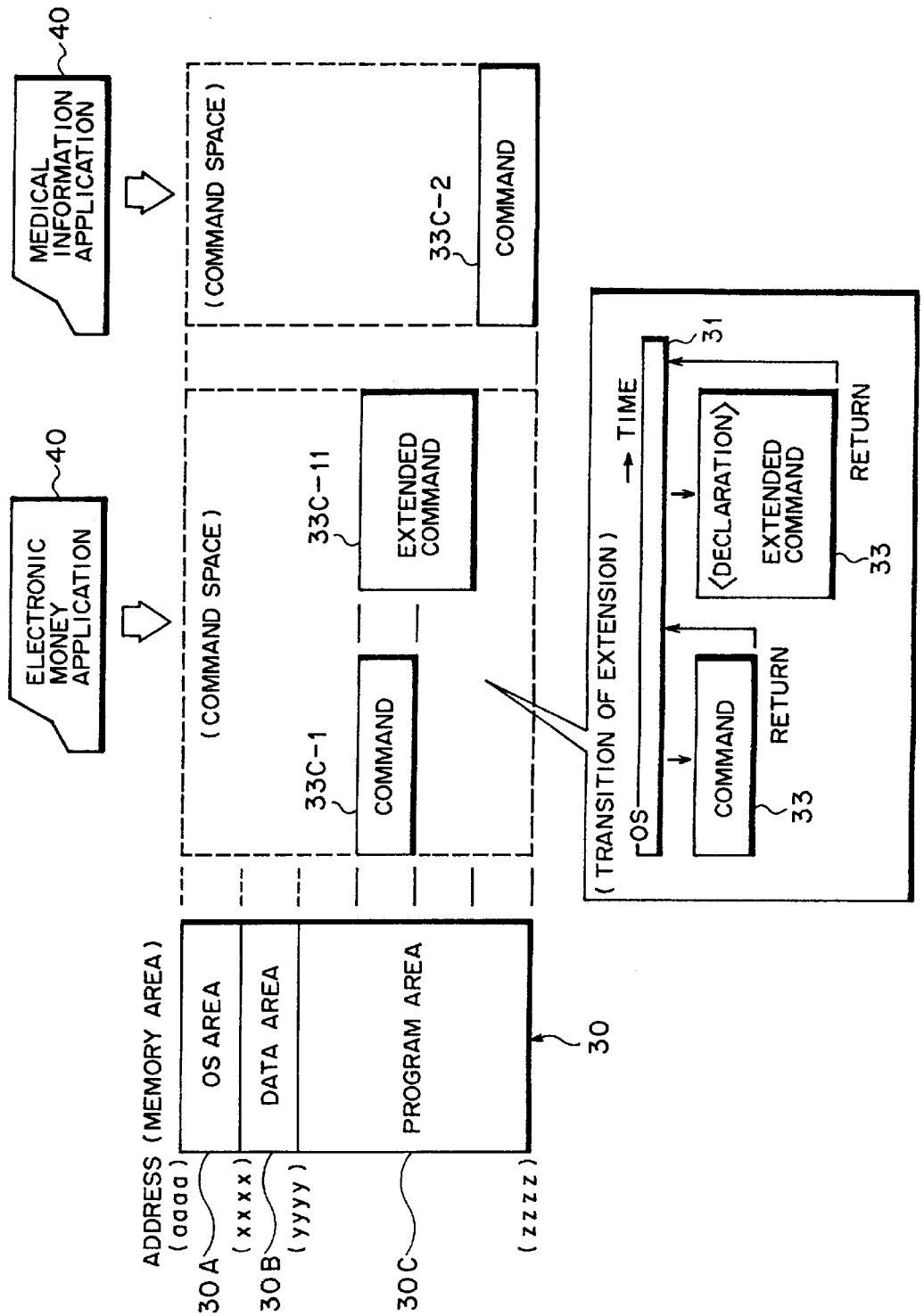

Meanwhile, as shown in FIG. 12 (or FIG. 8), in the two sets of programs configuring the above command space 33, it is also possible to extend the command space 33 (expand the area) depending upon the control in the OS space 31. In other words, it is possible to extend the command space 33 depending upon a declaration made to the OS space 30A while the command space 33 is active.

That is, as shown in FIG. 8 or FIG. 12, while the CPU 20 is operated in the area 33C-1 serving as the command space for the electronic money application, the operation is transferred to the OS space 31 with a command such as "return" as an "extension declaration." The OS space 31 allows extension of the command space, thereby extending the command space for the electronic money application from the area 33C-1 to an area 33C-11.

Thus, for example, at the time of collation of authentication information, it is also possible to provide the security (black box) in a part of the same application as long as the area which can not be written by the user other than the authenticated program developers is set as the extended area serving as the black box. Thus, it is possible to avoid falsification of the program, and avoid falsification of the encryption algorithm, the key, or the cryptographic processing for collation of authentication information.

Further, if the data or the access control information can be shared between the access spaces of the two applications (electronic money and medical information), the data or the access control information can be stored in the same area. In other words, in the IC card 10, the access space set according to division for each application can partially be defined as a shared space.

Figure 13:
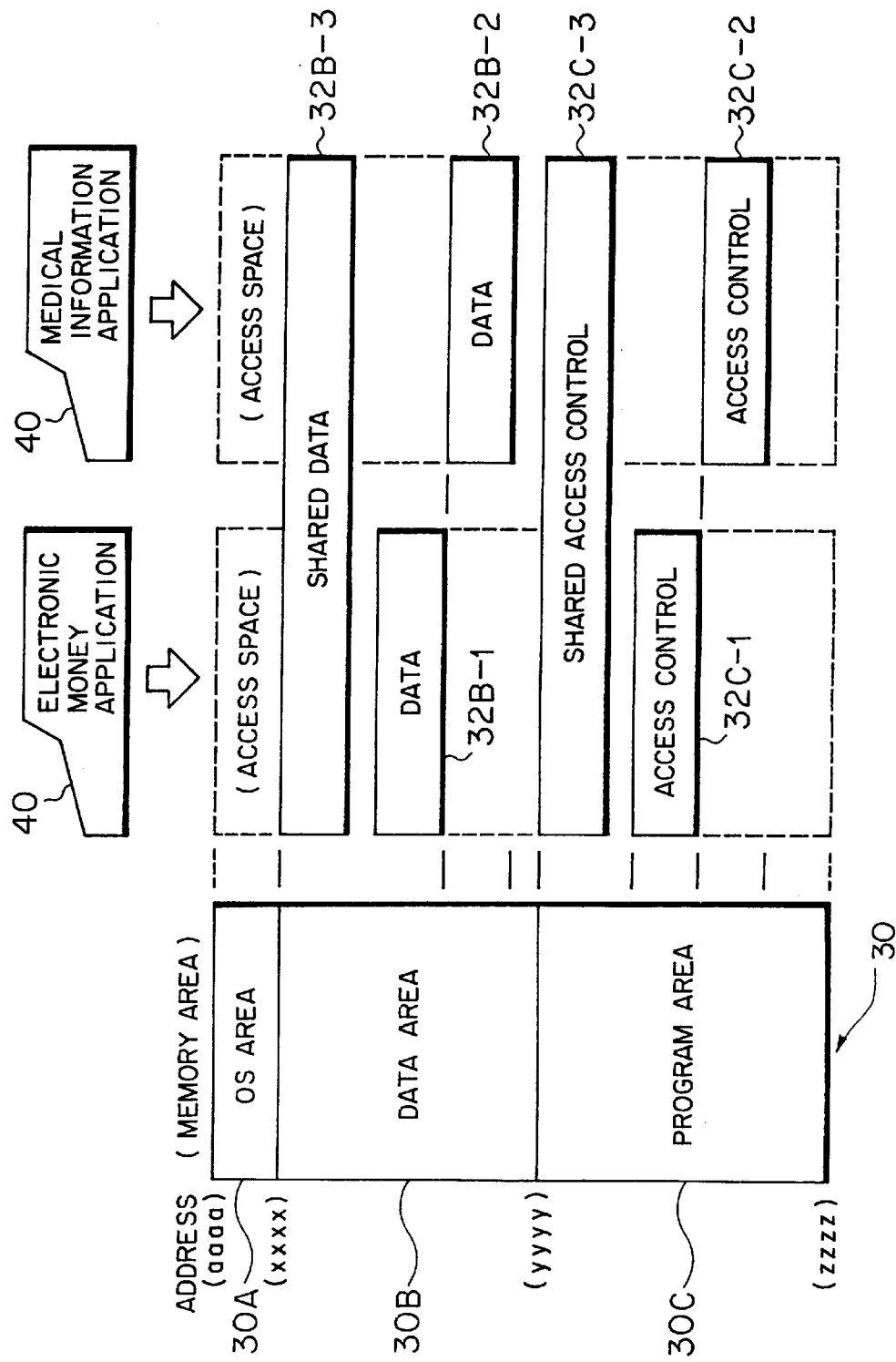
FIG. 13 is a diagram showing the access spaces serving as the operating area of the CPU 20 in the embodiment.

For example, as shown in FIG. 8 or FIG. 13, among the data corresponding to the access spaces in the two applications (electronic money and medical information), shareable data is stored in a shared data area 32B-3, while unshared data are respectively stored in the areas 32B-1, 32B-2.

Similarly, among the access control information corresponding to the access spaces in the two applications (electronic money and medical information), shareable data is stored in a shared access control area 32C-3, while unshared data are respectively stored in the areas 32C-1, 32C-2.

Further, if a command can be shared between the command spaces of the two applications (electronic money and medical information), the command can be stored in the same area. In other words, in the IC card 10, it is also possible to manage the memory 30 by defining as a shared space the partial command space set according to division for each application.

Figure 14:
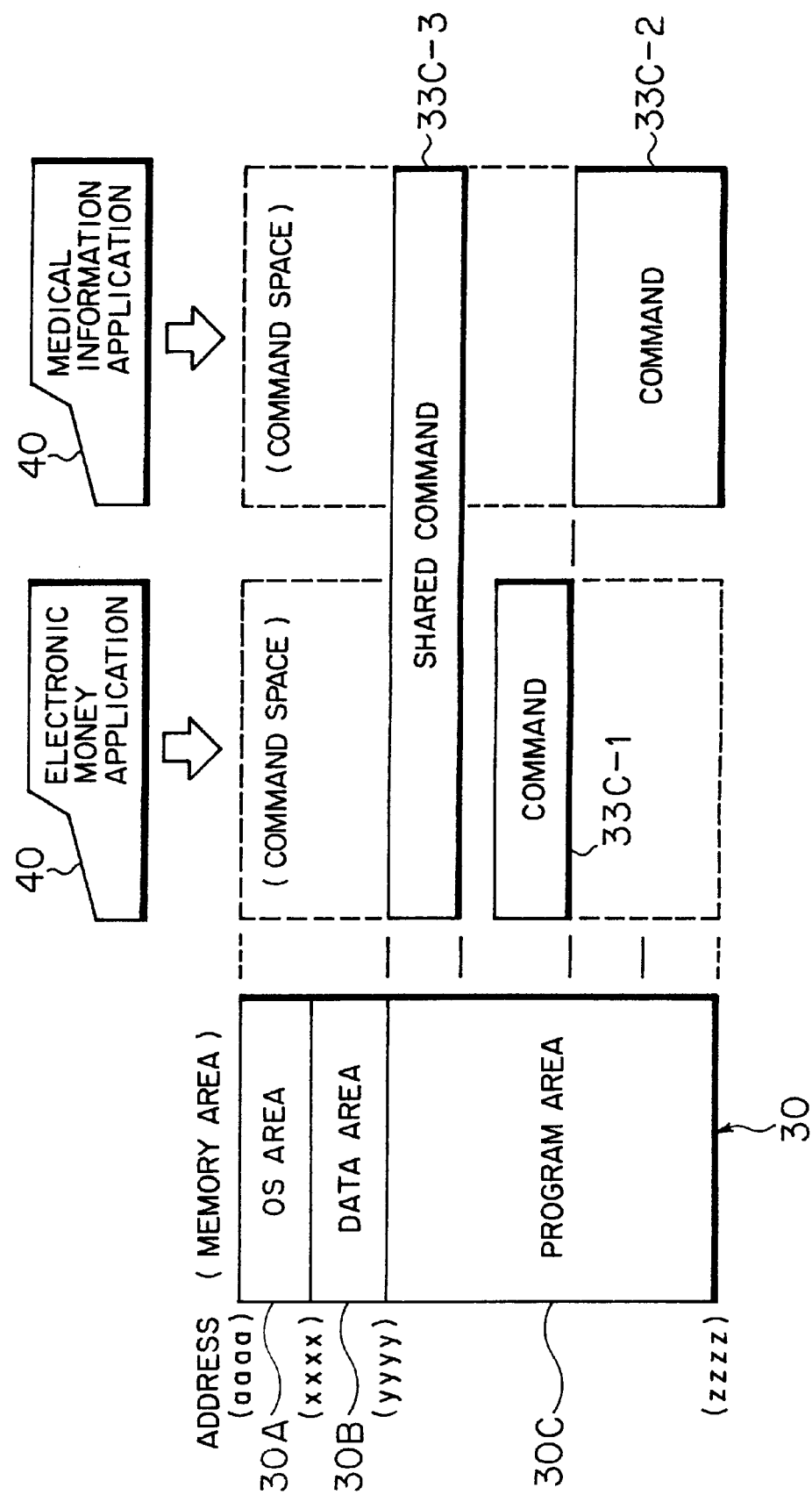
FIG. 14 is a diagram showing the command spaces serving as the operating area of the CPU 20 in the embodiment.

For example, as shown in FIG. 14, among command information corresponding to the access spaces in the two applications (electronic money and medical information), a shareable command is stored in a shared command area 33C-3, while unshared commands are respectively stored in the areas 33C-1, 33C-2.

Moreover, in order to extend the shared command area 33C-3 shown in FIG. 14, as shown in FIG. 8, the command space may be extended to a shared extended command area 33C-31 by the "extension declaration" from the OS space 31.

Figure 5:
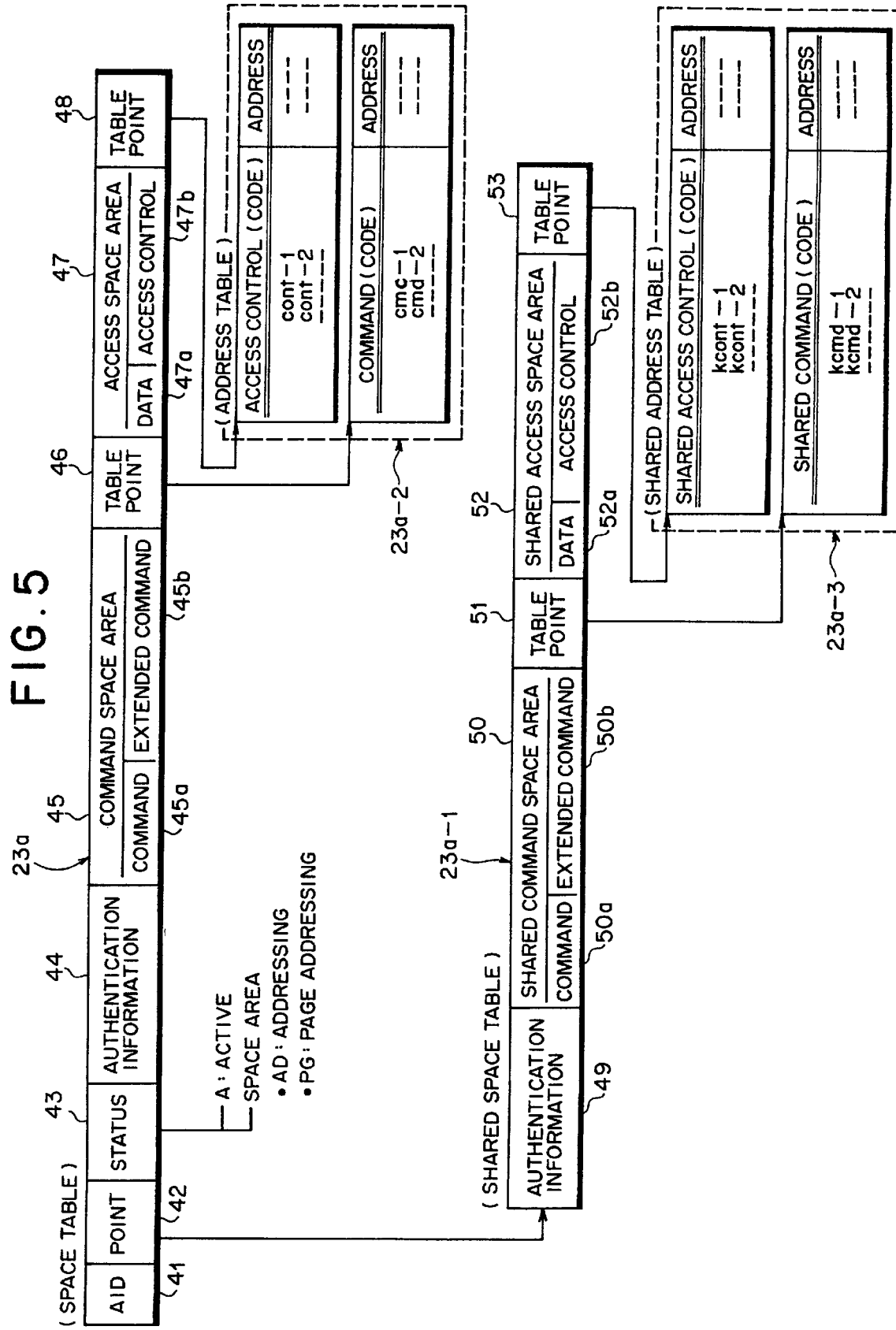
FIG. 5 is a diagram showing space tables referred by an area control portion in the embodiment.

(e) Description of Structures of Space Table and Control Register According to the Embodiment Meanwhile, the area control portion 23 extracts, by referring to the space table 23a as shown in FIG. 5, the area of the memory 30 used for the processing corresponding to the application processing request accepted by the accepting portion 22, and requests the instruction executing portion 21 to perform the processing in the extracted area. It is thereby possible to transfer the operation of the CPU 20 from the OS space 31 to any one of the access space 32 and the command space 33.

Here, the space table 23a shown in FIG. 5 includes application identification information (AID; Application Identification) 41, point information 42, status information 43, authentication information 44, command space area information 45, table point information 46, access space area information 47, and table point information 48.

The AID 41 is information for identification of application for each type of application, that is, identification information used for identification of application processing, and contained in the preceding application processing request accepted by the accepting portion 22.

Further, the point information 42 is information used for pointing to a shared space table 23a-1 described infra. The status information 43 shows whether or not an application corresponding to the ID information 41 is in an operating state, and shows a system of specifying in the area of the memory 30 the access space and the command space stored in the space table 23a.

Specifically, in the status information 43, "A" showing Active is set when the application is currently executed in the CPU 20, and "AD" for specification by address information or "PG" for specification by page information is set to show start positions and end positions of the access space and the command space in the memory 30.

Further, the authentication information 44 is collated with authentication information held by a user of the host apparatus 40, and is required for processing using an extended address described infra. Through the collation of the authentication information, it is possible to decide whether or not the user of the host apparatus 40 has access to the extended address space in the memory 30.

In other words, the space table 23a contains, for each type of application processing request from the host apparatus 40, the authentication information 44 for the decision of whether or not the application processing request can be accepted.

Further, the command space area information 45 shows a command space in the application corresponding to the ID information 41 by area information in the memory 30.

Besides, the command space area information 45 sets (specifies) an area of the memory 30 serving as the command space by start position information and end position information of the area. For example, address information can be used as the start position and end position information.

Specifically, the command space area information 45 includes command space information 45*a* holding a start address and an ending address of a memory area containing normal command information, and extended command space information 45*b* holding a start address and an ending address in the memory 30, concerning to an extended command space.

Further, the access space area information 47 shows an access space in the application corresponding to the ID information 41 by area information in the memory 30. Besides, the access space area information 47 sets an area of the memory 30 serving as the access space by start position information and end position information of the area. For example, the address information can similarly be used as the start position and end position information.

Specifically, the access space area information 47 includes data space information 47*a* holding a start address and an ending address in the memory 30, concerning to a data area serving as a candidate for access, and access control space information 47*b* holding a start address and an ending address in the memory 30, concerning to access control information.

Further, the table point information 46 is information used for pointing to an address table 23*a*-2 depending upon command control information accepted by the accepting portion 21. The table point information 48 is information used for pointing to the address table 23*a*-2 depending upon access control information accepted by the accepting portion 21.

Here, the address table 23*a*-2 contains the position in the area specified by the above command space area information 45 with encoded command information as a key, and an area of the access control information specified in the access space area information 47 with encoded access control information as a key through the address information.

That is, when the accepting portion 21 accepts the command information or the access control information, the area control portion 23 searches the address table 23*a*-2 with these information as keys. It is thereby possible to extract an address in the memory 30 corresponding to the command information or the access control information described above.

Meanwhile, the shared space table 23*a*-1 contains a shared access space and a shared command space which can be shared between one application corresponding to the above ID information 41 and another application. The shared space table 23*a*-1 includes authentication information 49, command space area information 50, table point information 51, access space area information 52, and table point information 53.

Here, the authentication information 49 is collated with the authentication information of the user of the host apparatus 40, and is required for processing using a shared extended address described infra. Through the collation of the authentication information, it is possible to decide whether or not the user of the host apparatus 40 has access to the shared extended address space in the memory 30.

Further, the shared command space area information 50 shows an area of a shared command space, also available in another application, in the command space in the application corresponding to the ID information 41. That is, the shared command space area information 50 sets the shared command space by start position information and end position information in the memory 30. For example, the address information can similarly be used as the start position and end position information.

Specifically, there are provided shared command space information 50*a* holding a start address and an ending address in the memory 30 containing normal shared command information, and shared extended command space information 50*b* in which an area of the memory 30 containing extended shared command information is set by a start address and an ending address.

Further, the shared access space area information 52 shows a shared access space also available in another application among areas of the access space in the application corresponding to the ID information 41. That is, the shared access space area information 52 specifies the shared access space by start position information and end position information in the memory 30. For example, the address information can similarly be used as the start position information and the end position information.

Specifically, the shared access space area information 52 includes shared data space information 52*a* used for setting a shared data area serving as a candidate for access by the start address and the ending address in the memory 30, and shared access control space information 52*b* used for setting shared access control information by the start address and the ending address in the memory 30.

Besides, the table point information 51 is information used for pointing to an address table 23*a*-3 depending upon shared command information accepted by the accepting portion 21. The table point information 53 is information used for pointing to the address table 23*a*-3 depending upon shared access control information accepted by the accepting portion 21.

Here, the address table 23*a*-3 contains positions in the memory 30 corresponding to encoded command information and encoded access control information by address information. The position in the memory 30 corresponding to the encoded command information is in the area specified by the above shared command space area information 50, and the position in the memory 30 corresponding to the encoded access control information is in the area specified by the access space area information 47.

That is, when the accepting portion 21 accepts the shared command information or the shared access control information, the area control portion 23 searches the address table 23*a*-2 with these information as keys. It is thereby possible to extract a corresponding address in the memory 30.

Figure 6:
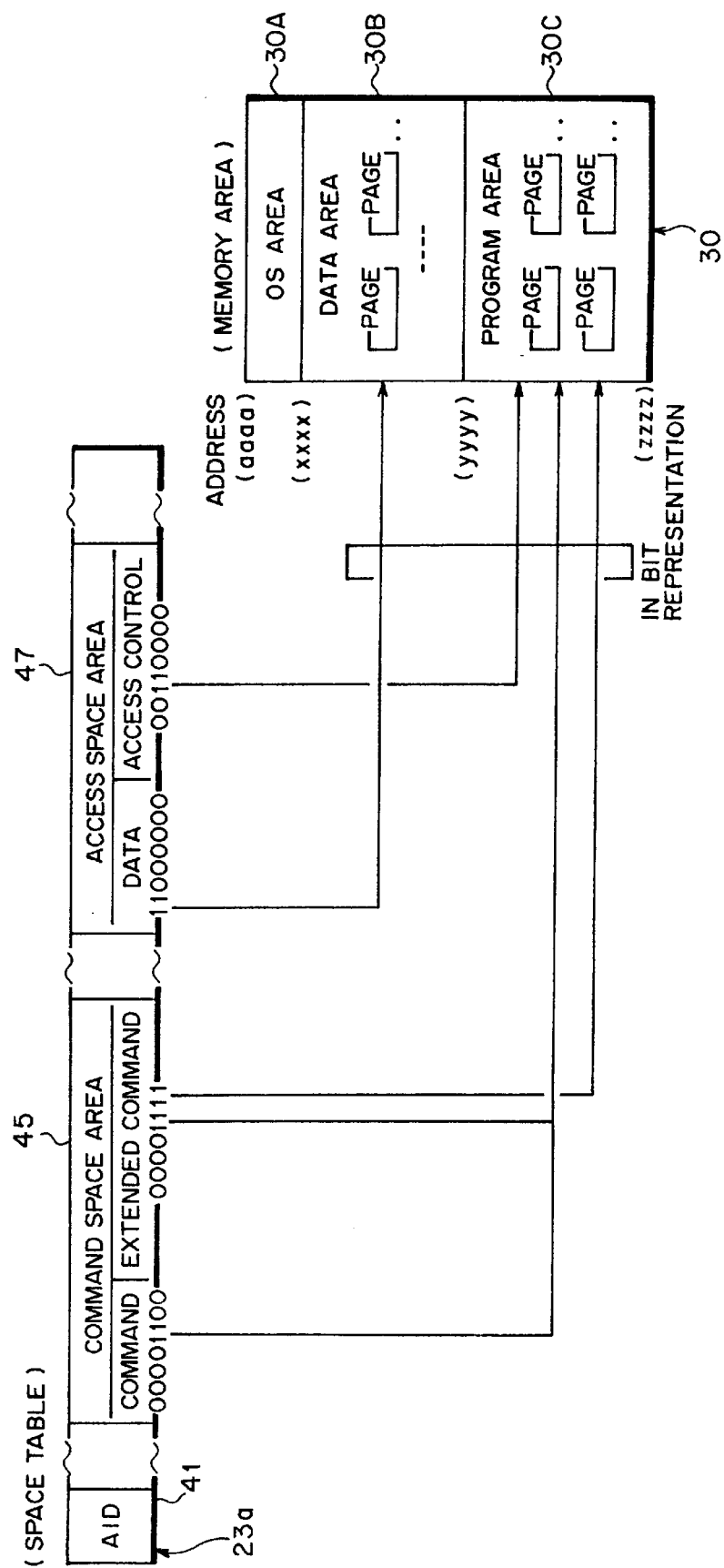
FIG. 6 is a diagram showing an essential part of the space table referred by the area control portion in the embodiment.

Moreover, in the above space table 23*a*, the spaces 32, 33 are specified by the start position information and the end position information in the area of the memory 30. However, it is to be noted that the area can be specified by using, as the position information, page information in bit representation as shown in FIG. 6 as well as the above address information. In this case, access to the memory 30 can be obtained by using an unillustrated table for conversion of the page information into the address information.

In other words, by referring to the area table 23*a*, the area control portion 23 can extract by the address information or the page information an area of the memory 30 for processing corresponding to an application processing request accepted by the accepting portion 21.

That is, the area control portion 23 may extract, by referring to the space table 23*a* and using the page information, the area of the memory for the processing corresponding to the application processing request accepted by the accepting portion 21. In such a case, it is possible to use the memory area, for example, as non-continuous areas.

Figure 7:
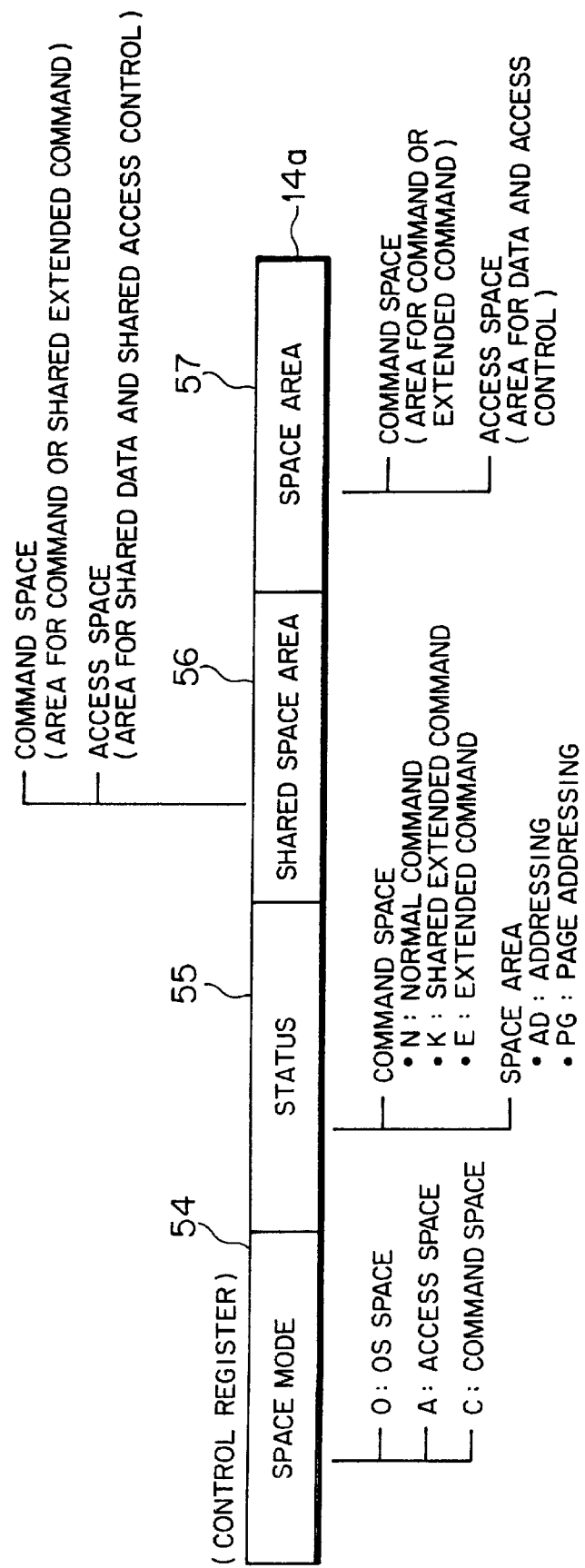
FIG. 7 is a diagram showing information set in a control register of an area monitoring portion in the embodiment.

Meanwhile, the above area monitoring portion 24 includes the control register 24a containing area setting information extracted in the area control portion 23, and decides whether the instruction executing portion 21 has access to the memory at the address identical with or different from the address (or page) in the area information set as hardware information in the control register 24a. For example, information as shown in FIG. 7 is set in the control register 24a.

That is, according to information set depending upon the result of search of the space table 23a in the area control portion 23, the control register 24a is provided with a space mode setting portion 54, a status setting portion 55, a shared space area setting portion 56, and a space area setting portion 57.

Here, the space mode setting portion 54 sets a space identifier showing the operating state of the instruction executing portion 21 of the CPU 20 depending upon the application processing request accepted by the accepting portion 22. The space identifier "O" is set when the instruction executing portion 21 is operated in the OS space 31, "A" is set when operated in the access space 32, and "C" is set when operated in the command space 33.

Further, the status register portion 55 sets information for identification of a method for specifying the access space 32 and the command space 33 by the above space table 23a, and sets, when the application processing request accepted by the accepting portion 22 is command information, information showing the type of command.

Specifically, type information "AD" is set when the access space 32 and the command space 33 shown in FIG. 8 are addressed, and "PG" is set when specified by the page information. Further, type information "N" is set when accepted command information is a normal command, type information "E" is set when the command information is a normal extended command, and type information "K" is set when the command information is a shared extended command.

Further, the shared space area setting portion 56 sets, according to the type of application accepted by the accepting portion 22, area information belonging to the shared access space and the shared command space which are also available in another application.

For example, in the case of a space set as shown in FIG. 8, the shared space area setting portion 56 sets area information about the areas 32B-3, 32C-3 of the memory 30 containing data (shared data) and access control information (shared access control information) which are also available in another application, and area information about the areas 33C-3, 33C-31 of the memory 30 containing a command (shared command information) or an extended command (shared extended command).

The space area setting portion 57 sets, according to the type of application (such as electronic money application) accepted by the accepting portion 22, area information belonging to an access space and a command space which are unavailable in another application.

That is, in the case of the space set as shown in FIG. 8, the space area information setting portion 57 sets area information about the areas 32B-1, 32C-2 of the memory 30 containing data and access control information which are unavailable in another application (such as medical information application), and area information about the areas 33C-1, 33C-11 of the memory 30 containing command information or an extended command.

Thus, the area of the memory 30 extracted by the area control portion 23 is stored in the control register 24a of the above area monitoring portion 24. Depending upon the stored information, it is possible to monitor whether or not the processing in the instruction executing portion 21 is being performed.

(E) Description of Issue Processing of IC Card According to the Embodiment

Figure 15:
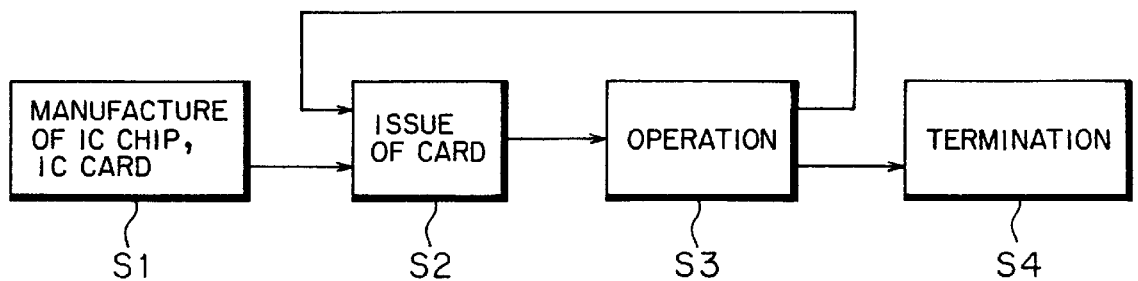
FIG. 15 is a diagram showing a life cycle of the IC card in the embodiment.

The IC card 10 according to the embodiment has a life cycle as shown in FIG. 15. That is, the IC card 10 shown in FIG. 15 is manufactured by embedding an IC chip in the card (Step S1), and is issued through loading processing of software for a desired application and storage of the authentication information held by the user in the card issuing apparatus (see reference numerals 15, 16 in FIG. 3) (Step S2).

Thereafter, the IC card 10 is operated by the user (Step S3), and is finally depreciated (Step S4). As the user needs, by appropriately loading software for another application in the card issuing apparatus, it is possible to reissue the IC card as an IC card having the functions of realizing, in particular, a plurality of application processing (from Step S2 to Step S3).

Meanwhile, when the card is issued, in order to maintain the security of the program in the IC card 10, it is required to authenticate the user having access to the IC card 10 and the host apparatus 40. A method for authenticating the user includes methods as shown in FIGS. 16 and 17.

Figure 16:
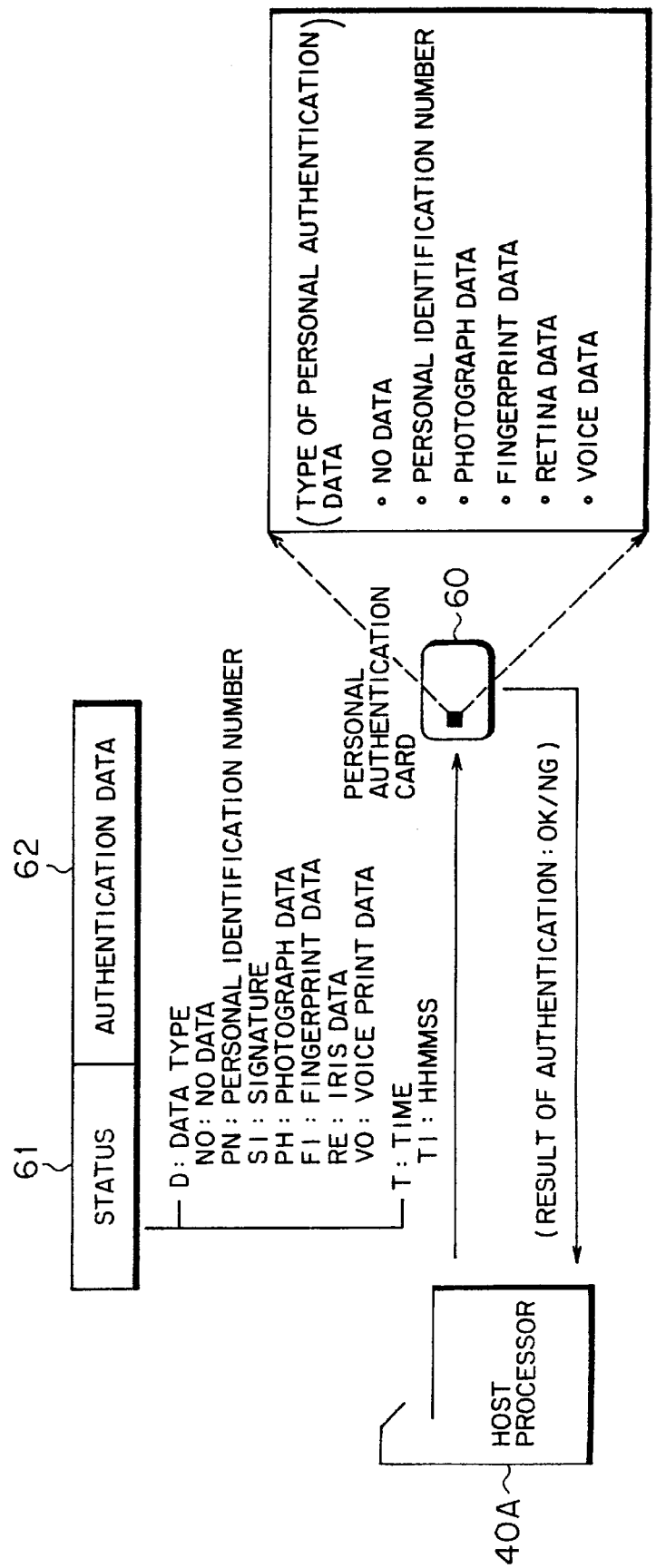
FIG. 16 is a diagram showing a method for authenticating personal identification when the IC card in the embodiment is issued.
Figure 17:
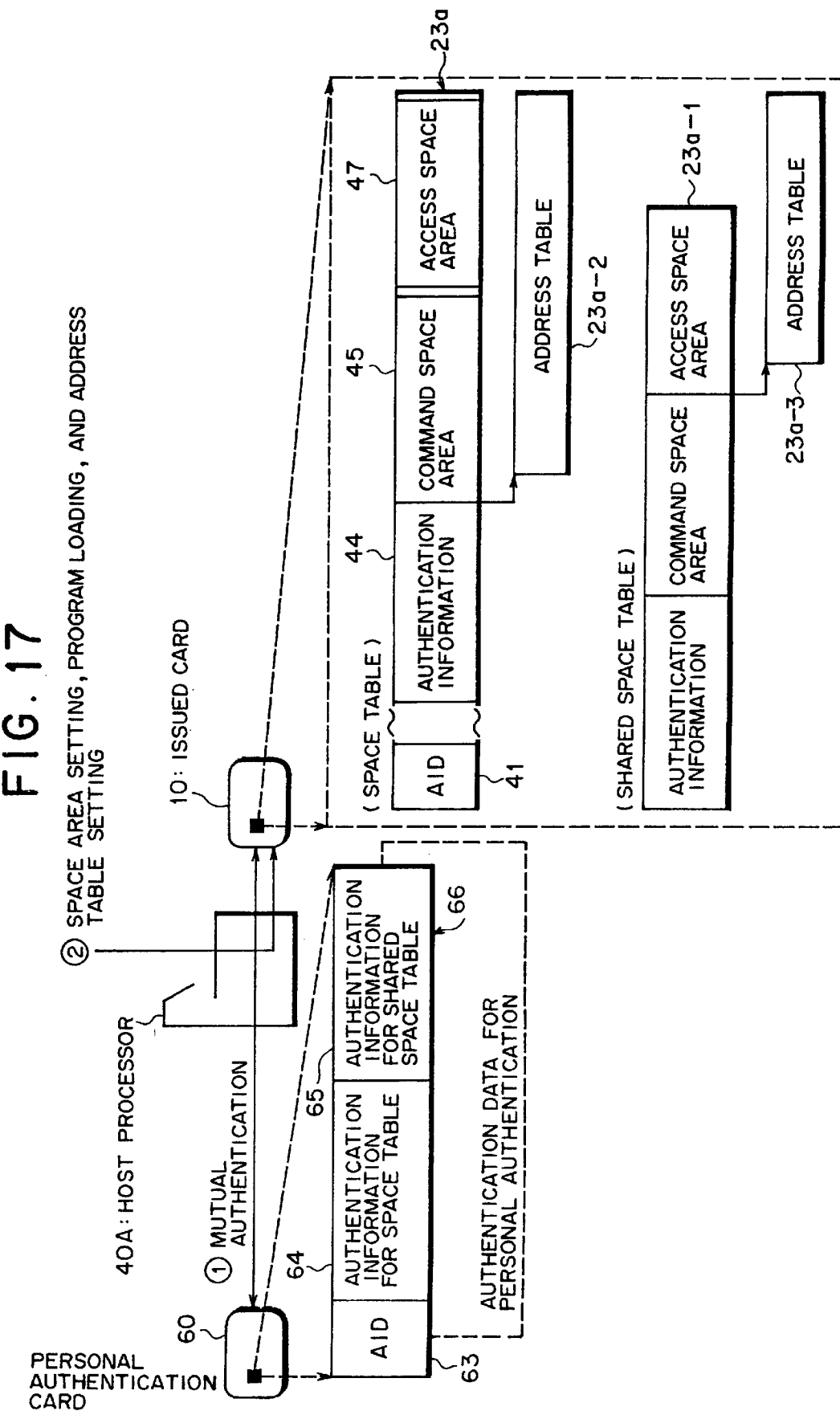
FIG. 17 is a diagram showing another method for authenticating personal identification when the IC card in the embodiment is issued.

That is, in the method for authenticating the user shown in FIG. 16, authentication information posted from a host apparatus 40A serving as the card issuing apparatus is collated with personal authentication information contained in a personal authentication card 60 held by the user apart from the IC card 10. In the case of identical authentication information (successful collation), a result of collation is posted to the host apparatus 40A together with the identical authentication information.

In other words, the authentication information unique to the host apparatus 40A capable of issuing the IC card 10 is posted to the personal authentication card 60 serving as an external card medium previously containing the authentication information (authentication information posting step). In the personal authentication card 60, the authentication information from the host apparatus 40A is collated for authentication with the authentication information contained in the personal authentication card 60 to decide whether or not the IC card 10 can be issued through the host apparatus 40A (collation decision step). If it is decided as a result of the decision that the IC card 10 can be issued, the desired IC card 10 is issued through the host apparatus 40A (issuing step). By using the issued IC card 10, it is possible to process a desired application processing request from the host apparatus 40A.

Specifically, in the personal authentication card 60, the collation can be made by using data type information (D) showing the type of authentication data stored as status information 61 from the host apparatus 40A, and authentication data 62. In addition, another collation can be made by using reception time information (T) stored as status information 61, and the authentication data 62.

Thereby, when the authentication is successful in the personal authentication card 60 (identical authentication information is detected), in the host apparatus 40A, authentication information for issue of the card is set in the space table 23a, thereby issuing the IC card 10 through the host apparatus 40A.

Moreover, in the data type forming the status information 61 transmitted from the host apparatus 40A, the data type "NO" denotes a case where the authentication data 62 has no data, "PN" is a case where the authentication data 62 is a personal identification number, "SI" is a case where the authentication data 62 is authentic signature, "PH" is a case where the authentication data 62 is photograph data, "FI" is a case where the authentication data 62 is fingerprint data, "RE" is a case where the authentication data 62 is iris data, and "VO" is a case where the authentication data 62 is voice print data.

In this case, since "retina data" is not posted from the host apparatus 40A, a successful collation can not be made by the retina data in the personal authentication card 60.

Further, when the IC card 10 is issued by loading program data of a card with a built-in integrated circuit (containing no program for application processing), the collation of the authentication information as shown in FIG. 17 is made prior to the issue.

That is, as shown in FIG. 17, the authentication information in the personal authentication card 60 is posted to the IC card 10, and the authentication information in the IC card 10 is posted to the personal authentication card 60 (authentication information posting step) The personal authentication card 60 collates for authentication the authentication information posted from the IC card 10 with the authentication information contained in the personal authentication card 60. Concurrently, the IC card 10 collates for authentication the authentication information posted from the personal authentication card 60 with the authentication information contained in the IC card 10, thereby deciding whether or not the program data can be written through the host apparatus 40A (collation decision step). When it is decided as a result of decision that the program data can be written, the IC card 10 performs the write operation through the host apparatus 40A (write operation step) It is also possible to authenticate personal identification at a time of writing.

Specifically, the authentication information preset in the space table 23a of the issued IC card and the authentication information from the personal authentication card 60 are collated mutually (in both the IC card 10 and the personal authentication card 60). When successful authentication can be obtained in both the cards 10, 60, for example, reissue processing for the IC card 10 is performed.

Here, as shown in FIG. 17, the personal authentication card 60 includes an authentication information table 66 containing, for each available application, information (AID) 63 for identification of the application, and authentication information 64, 65 used for the space table 23a and the shared space table 23a-1 in the IC card 10.

Thereby, the personal authentication card 60 takes as input, through the host apparatus 40A from the IC card 10, the authentication information preset at the time of manufacture of the IC card 10, and collates the authentication information with the authentication information 64 stored in the authentication information table 66.

Further, the IC card 10 takes as input, through the host apparatus 40A from the personal authentication card 60, the authentication information 64 stored in the authentication information table 66 of the personal authentication card 60, and collates the authentication information 64 with the authentication information preset at the time of manufacture of the IC card 10.

Thus, the mutual collation of the authentication information can be made in both the IC card 10 and the personal authentication card 60 (see reference numeral ①). When the successful results of collation can be provided in both the IC card 10 and the personal authentication card 60, the host apparatus 40A can set the space table 23a, thereafter loading the program data, and setting the address tables 23a-1, 23a-3 (see reference numeral ②).

Figure 18:
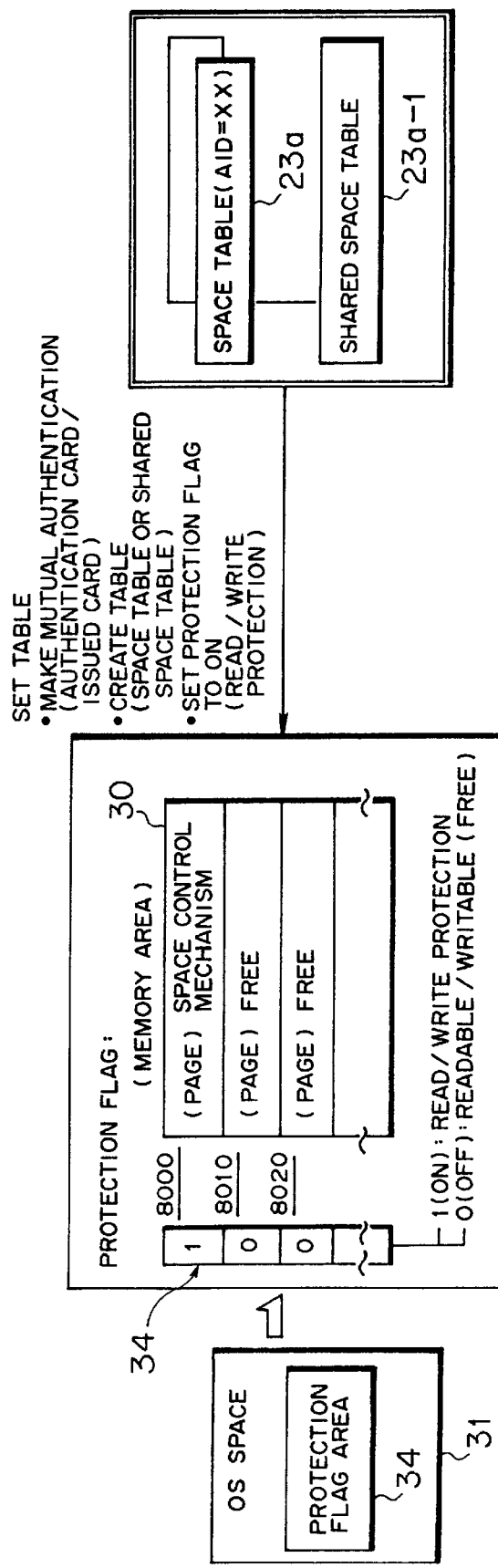
FIG. 18 is a diagram for explaining a method for setting a protection flag in the embodiment.

Meanwhile, when the above space table 23a is set in the IC card 10, as shown in FIG. 18, it is possible to set a protection flag area 35 in the OS space 31 according to the collated authentication information, thereafter loading the program data into the IC card 10.

Here, the protection flag area 34 contains flag information for inhibition of specified application processing performed by a user without specified authentication information. A specified area portion of the memory 30 is used as the protection flag area 34, and a protection flag 35 is set for each page in the specified area portion to serve as bit information for inhibition of reading from and writing on the area portion.

That is, the OS space 31 can inhibit the above access space 32 or command space 33 from having, in pages, access to the area of the memory 30 for the specified application processing.

For example, the area which can not be written by a user other than program developers may be set in the protection flag area 34. It is thereby possible to avoid falsification of the program, and avoid falsification of the encryption algorithm, the key, or the cryptographic processing for the collation of the authentication information.

Here, in the memory 30 of FIG. 18, a page having address "8000" contains, as information to be protected from modification by the user, program data for realizing the function as, for example, the area control portion 23. Bit information "1" as the protection flag 34 is set at the address "8000," while bit information "0" as a writable flag 34 is set in free areas of the memory 30, such as pages at addresses "8010," and "8020."

Moreover, the program may directly be loaded into the IC card 10 through the host apparatus 40A from the authenticated personal authentication card 60 (the program data previously stored in the personal authentication card 60 may be loaded).

Alternatively, it is also possible to load, through the host apparatus 40A, program data stored in another medium.

Further, the authentication may mutually be made in the host apparatus 40A and the personal authentication card 60 by using, in addition to the authentication information 44 preset in the space table 23a at the time of manufacture of the IC card 10, authentication information previously stored in the host apparatus 40A for issuing the IC card 10.

(F) Description of Operation and Effect in the Use of IC Card According to the Embodiment According to the above configuration, a description will now be given of the operation in the use of the IC card 10 according to the embodiment referring to FIGS. 19 to 22.

(F1) Description of Illustrative Switching Operation Between Access Space and Command Space When the IC card 10 accepts a command about an application processing request from the host apparatus 40, the OS space 31 accepts, in addition to the information (AID) for identification of the requested application processing, information contained in the command information, such as code information, and parameter information.

Figure 19:
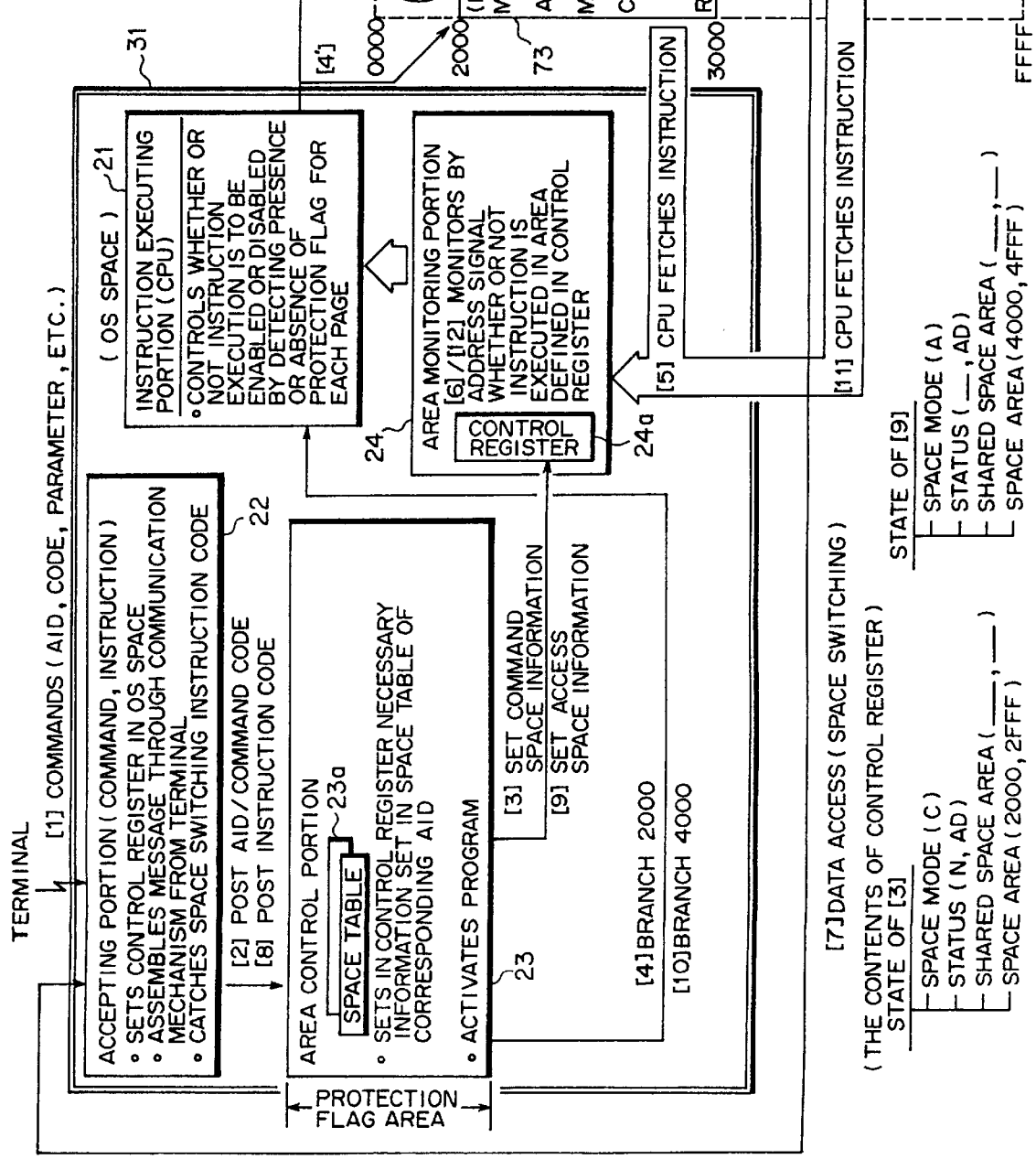
FIGS. 19 to 22 are block diagrams for explaining the operations by the use of the IC card in the embodiment.

In the OS space 31, as shown in FIG. 19, for command processing from the host apparatus 40, the operation can be transferred to an access space 72 or a command space 73 as required.

That is, when the memory space of the IC card 10 is managed, there are set, corresponding to the area of the memory 30, the access space 72 for storage of the data used by the application and for the operation of the access control, the command space 73 for the operation of the command for the processing other than the access control in the program, and the OS space 31 for a supervisory control of the processing in the access space and the command space. When the OS space 31 accepts the processing request from the host apparatus 40, the operation is transferred from the OS space 31 to the access space 72 or the command space 73 such that the instruction executing portion 21 can process the processing request.

Specifically, when the accepting portion 22 takes as input the command information (or instruction information) from the host apparatus 40 (see reference numeral [1]), the accepting portion 22 sets a state of the control register 24a to the OS space 31, and assembles a message (command information) through an unillustrated communication mechanism.

Subsequently, the area control portion 23 takes as inputs the code information (command code) about the command and the information (AID) for identification of application from the above accepting portion 22 (see reference numeral [2]). By referring to the space table 23a depending upon the AID, the area control portion 23 sets in the control register 24a necessary information set in the area of the space table 23a corresponding to the AID (see reference numeral [3]), and extracts an area of the memory 30 corresponding to the above command information so as to request the instruction executing portion 21 to perform the processing (see reference numeral [4]).

Specifically, the area control portion 23 extracts the area of the memory 30 for the corresponding processing from the address table 23a-2 depending upon the type of application processing request shown by the AID from the accepting portion 22. Moreover, the protection flag 35 (see FIG. 18) is given in address information of the area under the write protection and the read protection.

When the control is transferred from the OS space 31 to the command space 73, prior to the request for the processing to the instruction executing portion 21, the area control portion 23 sets space mode information 54 of the control register 24a to be switched from the OS space "O" to the Command space "C," and sets space area information 57 of the control register 24a to the command space 73 (at addresses "2000" to "2FFF") (see FIG. 7).

The instruction executing portion 21 accepts the request from the area control portion 23 by specifying the area of the memory 30, and has access to the extracted area of the memory 30, thereby performing the processing corresponding to the above command information. The control is thereby transferred from the OS space 31 to the command space 73 (see reference numeral [4']).

For example, when the IC card 10 accepts a command processing request according the electronic money application from the host apparatus 40, the instruction executing portion 21 executes, corresponding to the accepted command processing, program information stored at the address "2000" serving as the area of the memory 30.

As set forth above, the instruction executing portion 21 accepts the command processing request from the area control portion 23 by specifying the area of the memory 30, and performs the processing by having access to the corresponding area of the memory 30. At the point in time, the instruction executing portion 21 detects whether or not the protection flag 35 for each page is given in the address information extracted by the area control portion 23, thereby controlling whether the instruction execution is to be enabled or disabled.

Depending upon the command space 73 (at addresses "2000" to "2FFF," see reference numeral 33C-1 in FIG. 8) set in the space area 57 of the control register 24a, the area monitoring portion 24 monitors whether, during the execution of instruction, the instruction executing portion 21 has access to an address in the above command space 73 or in another space (see reference numerals [5], [6]).

Further, if a request for access to the access space 72 (at addresses "4000" to "4FFF," see reference numerals 32B-1, 32C-1) occurs during the above command processing, the request for access is posted to the accepting portion 22 operating in the OS space 31 (see reference numeral [7]).

When the accepting portion 22 takes as input the request for access to the access space 72 (space switching instruction), the accepting portion 22 sets the state of the control register 24a to the OS space 31, and captures (catches) an instruction code showing the space switching instruction.

Subsequently, the area control portion 23 takes as input the code information of the space switching instruction (see reference numeral [8]) from the above accepting portion 22, and retrieves and extracts address information corresponding to the space switching instruction from the address table 23a-2 pointed to the space table 23a. Moreover, the protection flag 35 (see FIG. 18) is given in the address information of the area under the write protection and the read protection.

Thereby, the area control portion 23 sets in the control register 24a the necessary information set in the space table 23a (see reference numeral [9]), and requests the instruction executing portion 21 to perform processing according to the corresponding address information (see reference numeral [10]).

Specifically, the area control portion 23 extracts, depending upon the space switching instruction from the accepting portion 22, the area of the memory 30 for corresponding processing from the address table 23a-2. The instruction executing portion 21 accepts the request from the area control portion 23 by specifying the area of the memory 30, and has access to the extracted area of the memory 30, thereby performing the processing corresponding to the above space switching information. The control is thereby transferred from the OS space 31 to the access space 72 (see reference numeral [10']).

That is, when the control is transferred from the OS space 31 to the command space 72, prior to the request for the processing to the instruction executing portion 21, the area control portion 23 sets the space mode information 54, the status information 55, and the space area information 57 of the control register 24a.

Specifically, the space mode information 54 is set to "A" showing the access space 72. In the status information 55, the command status is not set ("-"), and the method for specifying the memory 30 is set to "AD" showing the addressing. The space area information 57 is set to the access space 72 (at the addresses "4000" to "4FFF").

For example, in the IC card 10 applied to the above electronic money application, the space switching is made from the OS space 31 to the access space 72 during the processing in the command space 73, thereby executing, for example, the program information stored at the address "4000" serving as the area of the memory 30.

As stated above, the instruction executing portion 21 accepts the command processing request from the area control portion 23 by specifying the area of the memory 30, and performs the processing by having access to the corresponding area of the memory 30. At the point in time, the instruction executing portion 21 detects the presence or absence of the protection flag 35 for each page, thereby controlling whether the instruction execution is to be enabled or disabled.

Further, depending upon the access space 72 (at the addresses "4000" to "4FFF," see reference numeral 32B-1 in FIG. 8) set in the space area 57 of the control register 24a, the area monitoring portion 24 monitors whether, during the execution of instruction, the instruction executing portion 21 has access to an address in the above command space 73 or in another space (see reference numerals [11], [12]).

Figure 20:
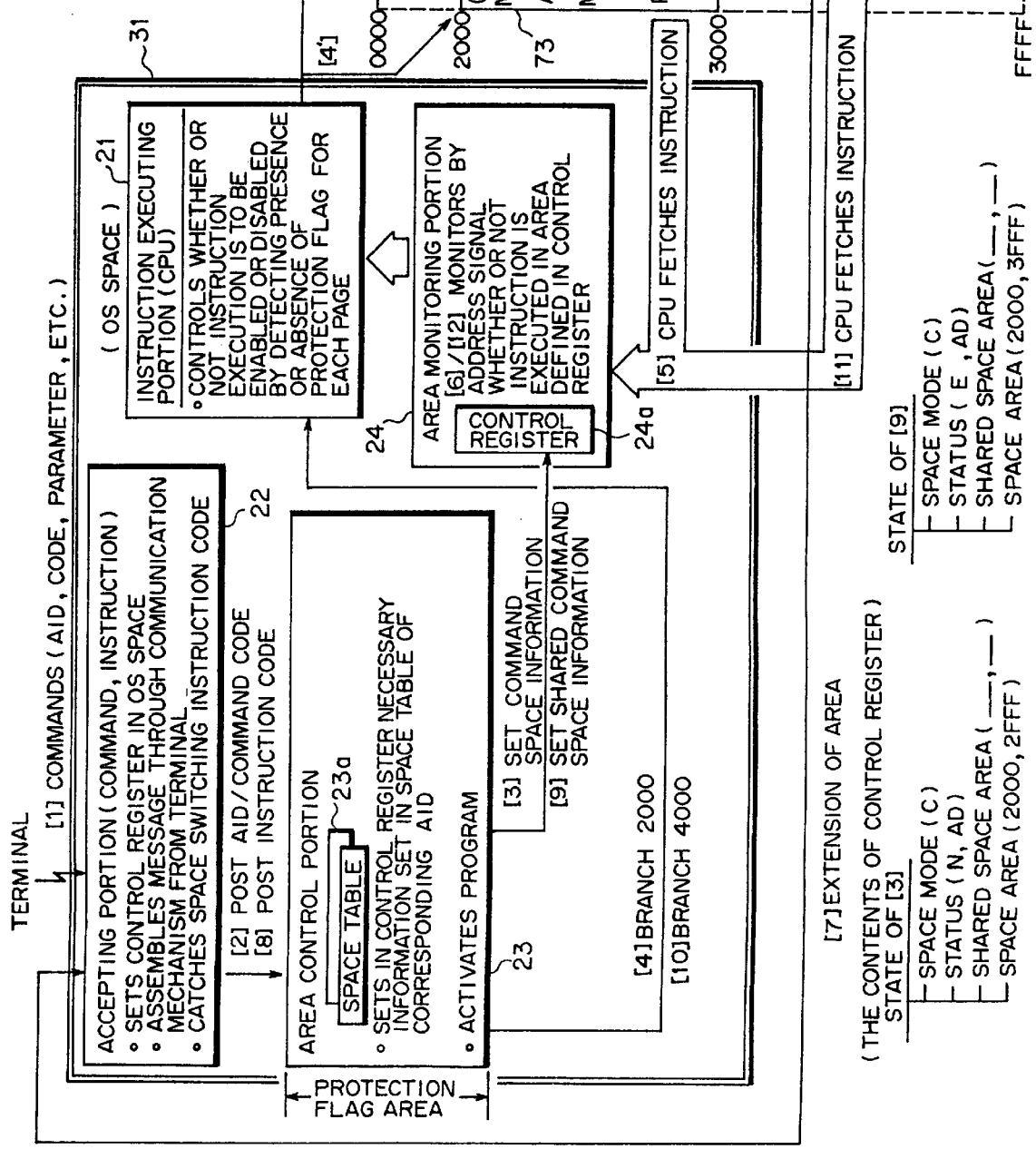

(F2) Description of Illustrative Switching Operation Between Access Space and Command Space When the IC card 10 accepts a command about an electronic money application processing request from the host apparatus 40, the processing in the command space 73 (see reference numeral 33C-1 in FIG. 8) is performed in the instruction executing portion 21 as in the above discussion (see reference numerals [1] to [6], and [4'] in FIG. 20). Moreover, the process steps [1] to [6], and [4'] shown in FIG. 20 correspond to the process steps [1] to [6], and [4'] shown in FIG. 19. Here, in the above instruction executing portion 21, while the command processing is performed, a request (area extension request) to extend the command space 73 to an extended command space 73A (at addresses "3000" to "3FFF," see reference numeral 33C-11 in FIG. 8) may occur. In this case, the area extension request is posted to the accepting portion 22 operating in the OS space 31 (see reference numeral [7]).

When the accepting portion 22 takes as input a request for access to the extended command space 73A (area extension instruction), the accepting portion 22 sets the state of the control register 24a to the OS space 31, and captures (catches) an instruction code showing the area extension instruction. Subsequently, the area control portion 23 takes as input the code information of the area extension instruction from the above accepting portion 22 (see reference numeral [8]), and retrieves and extracts address information corresponding to the area extension instruction from the address table 23a-2 pointed to the space table 23a. Moreover, the protection flag 35 (see FIG. 18) is given in the address information of the area under the write protection and the read protection.

Thereby, the area control portion 23 sets in the control register 24a the necessary information set in the space table 23a (see reference numeral [9]), and requests the instruction executing portion 21 to perform processing according to the corresponding address information (see reference numeral [10]).

Specifically, the area control portion 23 extracts, depending upon the area extension instruction from the accepting portion 22, the area of the memory 30 for corresponding processing from the address table 23a-2. The instruction executing portion 21 accepts the request from the area control portion 23 by specifying the area of the memory 30, and has access to the extracted area of the memory 30, thereby performing the processing corresponding to the above area extension information. The control is thereby transferred from the OS space 31 to the extended command space 73A (see reference numeral [10']).

Moreover, when the control is transferred from the OS space 31 to the extended command space 73A, prior to the request for the processing to the instruction executing portion 21, the area control portion 23 sets the space mode information 54, the status information 55, and the space area information 57 of the control register 24a.

Specifically, the space mode information 54 is set to "A" showing the command space. In the status information 55, the command status is set to "E" showing the extended command, and the method for specifying the memory 30 is set to "AD" showing the addressing. The space area information 57 is set to the extended command space 73A (at addresses "2000" to "3FFF").

Moreover, the instruction executing portion 21 accepts the extended command processing request from the area control portion 23 by specifying the area of the memory 30, and performs the processing by having access to the corresponding area of the memory 30. At the point in time, the instruction executing portion 21 detects the presence or absence of the protection flag 35 for each page, thereby controlling whether the instruction execution is to be enabled or disabled.

Further, depending upon the extended command space 73A (at the addresses "2000" to "3FFF," see reference numeral 33C-11 in FIG. 8) set in the space area 57 of the control register 24a, the area monitoring portion 24 monitors whether, during the execution of instruction, the instruction executing portion 21 has access to an address in the above extended command space 73A or in another space (see reference numerals [11], [12]).

Figure 21:
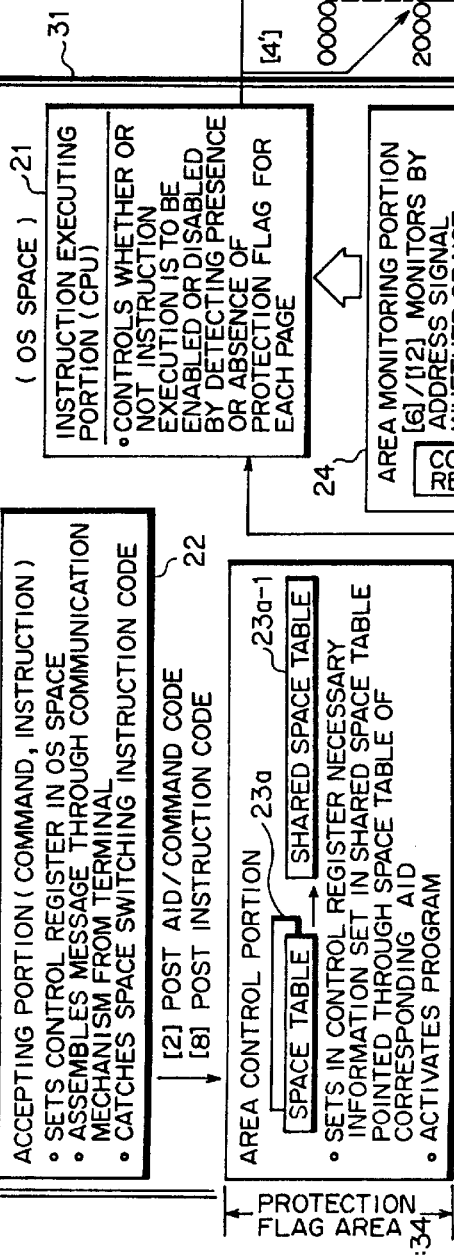

(F3) Description of Illustrative Switching Operation Between Shared Access Space and Shared Command Space As shown in FIG. 21, in the IC card 10, among commands about an electronic money application processing request from the host apparatus 40, a command corresponding to a shared command space 73B (see reference numeral 33C-3 in FIG. 8) is processed in the shared command space 73B.

Specifically, when the accepting portion 22 takes as input the command information (or instruction information) from the host apparatus 40 (see reference numeral [1]), the accepting portion 22 sets the state of the control register 24a to the OS space 31, and assembles a message (command information) through an unillustrated communication mechanism.

Subsequently, the area control portion 23 takes as inputs the code information (command code) about the command and the information (AID) for identification of application (see reference numeral [2]). By referring to the space table 23a depending upon the AID, the area control portion 23 sets in the control register 24a the necessary information set in the area of the space table 23a corresponding to the AID (see reference numeral [3]), and extracts an area of the memory 30 corresponding to the above command information so as to request the instruction executing portion 21 to perform the processing (see reference numeral [4]).

Specifically, the area control portion 23 extracts the shared command space 73B (at, for example, addresses "2000" to "2FFF") also available for command processing in another application processing as the area of the memory 30 for the corresponding processing by referring to the address table 23a-2 pointed to the space table 23a depending upon the command information from the accepting portion 22. Moreover, the protection flag 35 (see FIG. 18) is given in the address information of the area under the write protection and the read protection.

The instruction executing portion 21 accepts the request from the area control portion 23 by specifying the area of the memory 30, and has access to the extracted area of the memory 30, thereby performing the processing corresponding to the above command information. The control is thereby transferred from the OS space 31 to the command space 73 (see reference numeral [4']).

Moreover, when the control is transferred from the OS space 31 to the shared command space 73, prior to the request for the processing to the instruction executing portion 21, the area control portion 23 sets the space mode information 54, the status information 55, and a shared space area 56 of the control register 24a (see FIG. 7).

Specifically, the space mode information 54 is set to "C" showing the command space. In the status information 55, the command status is set to "N" showing the normal command, and the method for specifying the memory 30 is set to "AD" showing the addressing. The shared space area information 56 is set to the shared command space 73B (at addresses "2000" to "3FFF").

As described above, the instruction executing portion 21 accepts the command processing request from the area control portion 23 by specifying the area of the memory 30, and performs the processing by having access to the corresponding area of the memory 30. At the point in time, the instruction executing portion 21 detects the presence or absence of the protection flag 35 for each page, thereby controlling whether the instruction execution is to be enabled or disabled.

Depending upon the shared command space 73B (at the addresses "2000" to "3FFF," see reference numeral 33C-3 in FIG. 8) set in the space area 57 of the control register 24a, the area monitoring portion 24 monitors whether, during the execution of instruction, the instruction executing portion 21 has access to an address in the above command space 73 or in another space (see reference numerals [5], [6]).

Further, in the above instruction executing portion 21, while the command processing is performed, a request for access to the shared access space 72C (at addresses "4000" to "4FFF," see reference numerals 32B-3, 32C-3 in FIG. 8) may occur. In this case, the request for access is posted to the accepting portion 22 operating in the OS space 31 (see reference numeral [7]).

When the accepting portion 22 takes as input the request for access to the shared access space 72B (space switching instruction), the accepting portion 22 sets the state of the control register 24a to the OS space 31, and captures (catches) an instruction code showing the space switching instruction.

Subsequently, the area control portion 23 takes as input the code information of the space switching instruction from the above accepting portion 22 (see reference numeral [8]), and retrieves and extracts address information corresponding to the space switching instruction from the shared address table 23a-3 pointed to the space table 23a. Moreover, the protection flag 35 (see FIG. 18) is given in the address information of the area under the write protection and the read protection.

Thereby, the area control portion 23 sets in the control register 24a the necessary information set in the space table 23a (see reference numeral [9]), and requests the instruction executing portion 21 to perform processing according to the corresponding address information (see reference numeral [10]).

Specifically, the area control portion 23 extracts, depending upon the space switching instruction from the accepting portion 22, the area of the memory 30 for corresponding processing from the address table 23a-2. The instruction executing portion 21 accepts the request from the area control portion 23 by specifying the area of the memory 30, and has access to the extracted area of the memory 30, thereby performing the processing corresponding to the above space switching information. The control is thereby transferred from the OS space 31 to the shared access space 72B (see reference numeral [10']).

That is, when the control is transferred from the OS space 31 to the shared access space 72B, prior to the request for the processing to the instruction executing portion 21, the area control portion 23 sets the space mode information 54, the status information 55, and the space area information 57 of the control register 24a.

Specifically, the space mode information 54 is set to "A" showing the shared access space 72B. In the status information 55, the command status is not set ("-"), and the method for specifying the memory 30 is set to "AD" showing the addressing. The shared space area information 56 is set to the shared access space 72B (at addresses "4000" to "4FFF").

For example, in the IC card 10 applied to the above electronic money application, the space switching is made from the OS space 31 to the shared access space 72B during the processing in the shared command space 73B, thereby executing, for example, the program information stored at the address "4000" serving as the area of the memory 30.

As stated above, the instruction executing portion 21 accepts the command processing request from the area control portion 23 by specifying the area of the memory 30, and performs the processing by having access to the corresponding area of the memory 30. At the point in time, the instruction executing portion 21 detects the presence or absence of the protection flag 35 for each page, thereby controlling whether the instruction execution is to be enabled or disabled.

Further, depending upon the shared access space 72B (at the addresses "4000" to "4FFF," see reference numerals 32B-3, 32C-3 in FIG. 8) set in the shared space area information 56 of the control register 24a, the area monitoring portion 24 monitors whether, during the execution of instruction, the instruction executing portion 21 has access to an address in the above shared access space 72B or in another space (see reference numerals [11], [12]).

Figure 22:
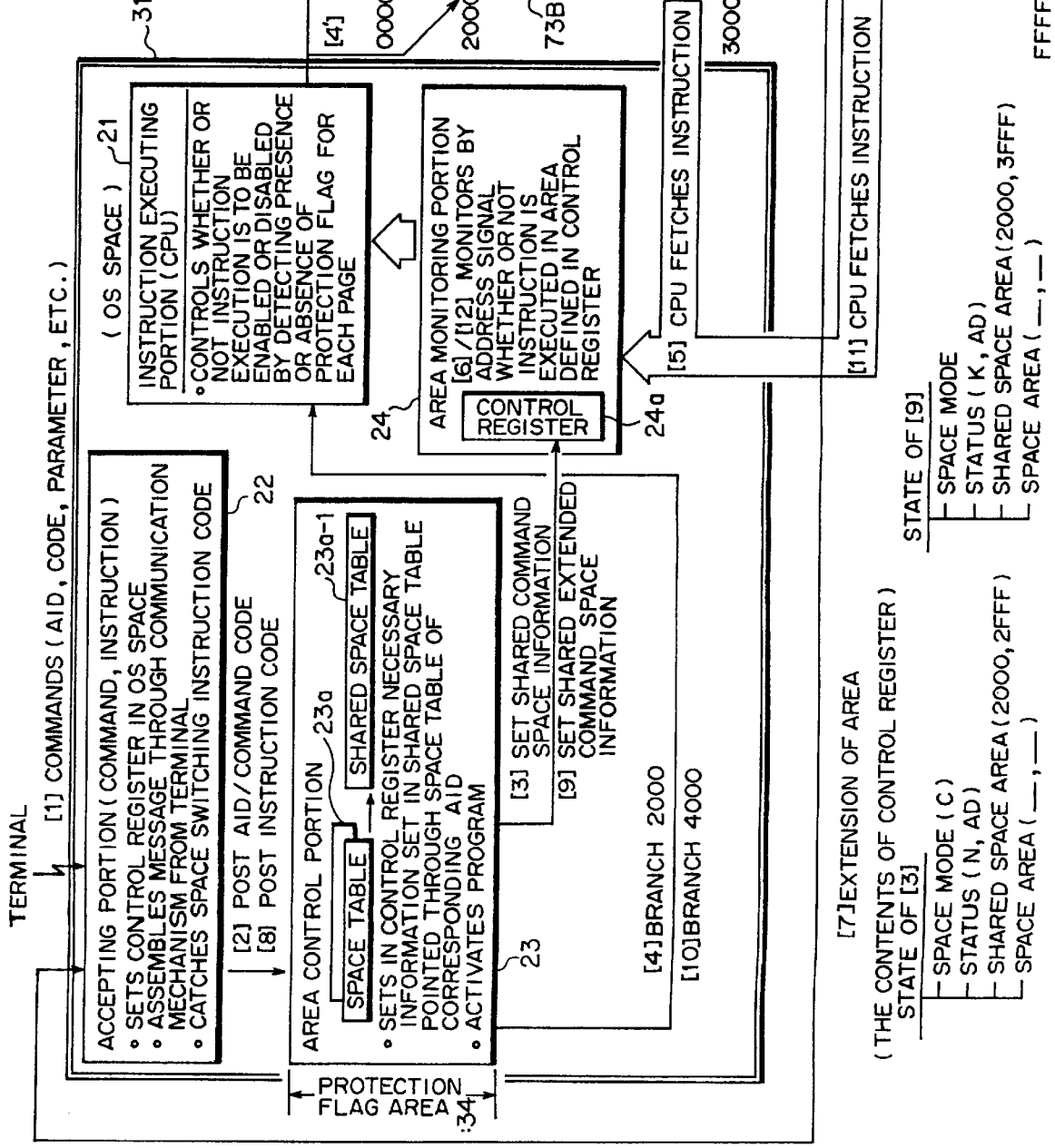
Figure 23:
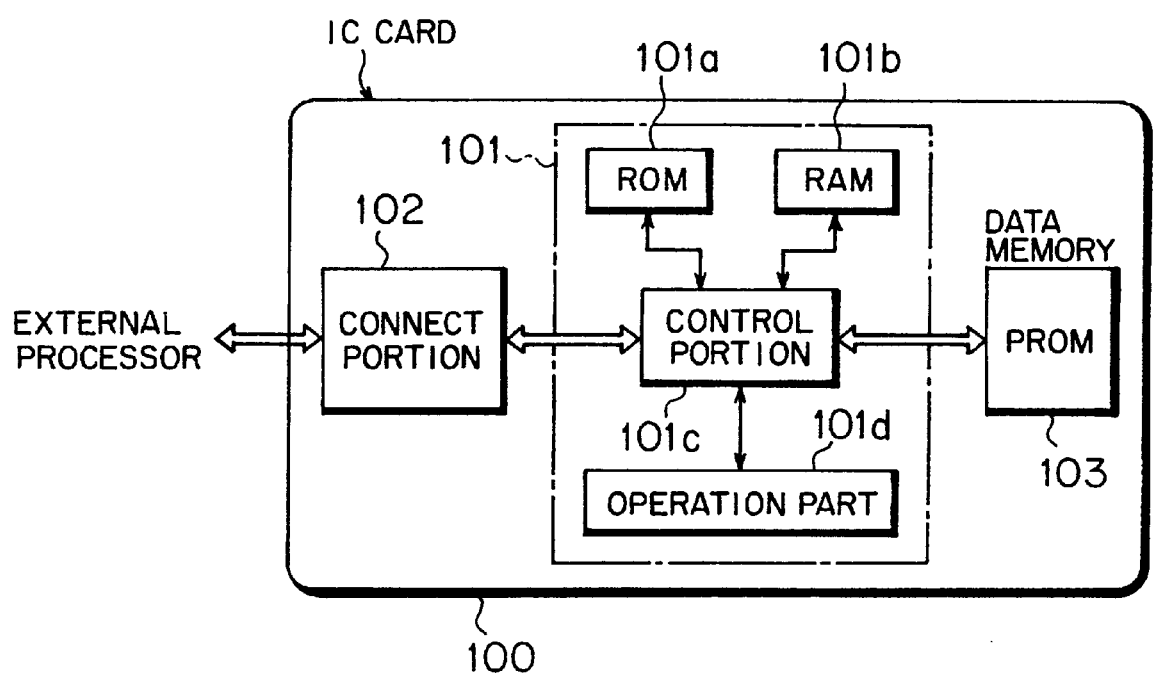
FIG. 23 is a block diagram showing a hardware configuration of an IC card.

(F4) Description of Illustrative Switching Operation Between Access Space and Command Space As shown in FIG. 22, in the IC card 10, if an electronic money application processing request from the host apparatus 40 is a command corresponding to the shared command space 73B (see reference numeral 33C-3 in FIG. 8), the processing in the shared command space 73B (see reference numeral 33C-3 in FIG. 8) is performed in the instruction executing portion 21 as in the above case (see FIG. 20) (see reference numerals [1] to [6], and [4'] in FIG. 22). Moreover, the process steps [1] to [6], and [4'] shown in FIG. 22 correspond to the process steps [1] to [6], and [4'] shown in FIG. 21.

Here, in the above instruction executing portion 21, while the command processing is performed, a request (area extension request) to extend the shared command space 73B (at addresses "2000" to "2FFF," see reference numeral 33C-3 in FIG. 8) to a shared extended command space 73C (at addresses "2000" to "3FFF," see reference numeral 33C-31 in FIG. 8) may occur. In this case, the area extension request is posted to the accepting portion 22 operating in the OS space 31 (see reference numeral [7]).

When the accepting portion 22 takes as input the request for access to the shared extended command space 73C (area extension instruction), the accepting portion 22 sets the state of the control register 24a to the OS space 31, and captures (catches) an instruction code showing the area extension instruction.

Subsequently, the area control portion 23 takes as input the code information of the area extension instruction from the above accepting portion 22 (see reference numeral [8]), and retrieves and extracts address information corresponding to the area extension instruction from the shared address table 23a-3 pointed to the space table 23a. Moreover, the protection flag 35 (see FIG. 18) is given in the address information of the area under the write protection and the read protection.

Thereby, the area control portion 23 sets in the control register 24a the necessary information set in the space table 23a (see reference numeral [9]), and requests the instruction executing portion 21 to perform processing according to the corresponding address information (see reference numeral [10]).

Specifically, the area control portion 23 extracts, depending upon the area extension instruction from the accepting portion 22, the area of the memory 30 for the corresponding processing from the shared address table 23a-3. The instruction executing portion 21 accepts the request from the area control portion 23 by specifying the area of the memory 30, and has access to the extracted area of the memory 30, thereby performing the processing corresponding to the above area extension information. The control is thereby transferred from the OS space 31 to the shared extended command space 73C (see reference numeral [10']).

That is, when the control is transferred from the OS space 31 to the shared extended command space 73C, prior to the request for the processing to the instruction executing portion 21, the area control portion 23 sets the space mode information 54, the status information 55, and the shared space area information 56 of the control register 24a.

Specifically, the space mode information 54 is set to "A" showing the command space. In the status information 55, the command status is set to "K" showing the shared extended command, and the method for specifying the memory 30 is set to "AD" showing the addressing. The shared space area information 56 is set to the shared extended command space 73C (at addresses "2000" to "3FFF").

Moreover, the instruction executing portion 21 accepts the command processing request from the area control portion 23 by specifying the area of the memory 30, and performs the processing by having access to the corresponding area of the memory 30. At the point in time, the instruction executing portion 21 detects the presence or absence of the protection flag 35 for each page, thereby controlling whether the instruction execution is to be enabled or disabled.

Further, depending upon the shared extended command space 73C (at the addresses "2000" to "3FFF," see reference numeral 33C-31 in FIG. 8) set in the space area 56 of the control register 24a, the area monitoring portion 24 monitors whether, during the execution of instruction, the instruction executing portion 21 has access to an address in the above shared extended command space 73C or in another space (see reference numerals [11], [12]).

As set forth above, according to the embodiment, there are provided the instruction executing portion 21, the area control portion 23, and the area monitoring portion 24. Corresponding to the area of the memory 30, there are set the access space 72 for the operation of the access control, the command space 73 for the operation of the command, and the OS space 31 for the supervisory control of the processing in the access space 72 and the command space 73. When the processing request from the host apparatus 40 is accepted in the OS space 31, the operation can be transferred from the OS space 31 to the access space 72 or the command space 73 such that the instruction executing portion 21 can process the processing request. In order to maintain the security function of the stored data, an area for the operation of the CPU 20 is restrictively preset in the memory at a time of execution of the program for realizing one application function. It is thereby possible to prevent data to be managed by other application functions from being fetched. As a result, it is possible to protect encryption algorithm/key/cryptographic processing unique to each application from falsification through other applications.

For example, data to be managed by the electronic money application is prevented from being fetched through the medical information application. It is thereby possible to protect data to be managed by each application even when the user loads an optional application.

Further, it is possible to extend the command space 73 depending upon the declaration made to the supervisory control space while the command space 73 is active. Hence, for example, at the time of collation of authentication information, it is also possible to provide security (black box) in a part of the same application as long as the area which can not be written by a user other than authenticated program developers is set as the extended area serving as the black box. Thus, it is possible to avoid falsification of the program, and avoid falsification of an encryption algorithm, a key, or cryptographic processing for collation of authentication information.

Further, it is possible to partially define, as the mutually shared space, the access space set according to division for each application or the command space in which the command execution is enabled. As a result, there are advantages in that a space sharing control can be realized between the access space 72 and the command space 73, and the memory area can effectively be used.

Further, the IC card 10 is issued by the authentication information posting step, the collation decision step, and the issuing step (or the write operation step). Since the authentication information is set when the IC chip/IC card is manufactured, there is an advantage in that, for example, falsification of the medium can be avoided for the period from the manufacture to the issue of the card. In addition, since the authentication is performed based upon the personal authentication card 60, there is another advantage in that, for example, an important program (such as definition of the space areas 56, 57 related to the AID 41 in the space table 23a, and space memory dump processing) can be written by only the application manager, and so forth.

Though the above embodiment has been described in detail with reference to the case where the present invention is applied to the IC card, it is to be noted that the present invention should not be limited to this, and may be applied to any type of portable card medium other than the IC card.

What is claimed is:

1. A portable card medium in which a memory contains a plurality of programs to be executed in response to various application processing requests from a host apparatus and data used for execution of the programs, and the respective programs are executed in an executing mechanism depending upon the stored programs and data, thereby processing a desired application processing request from the host apparatus, and the portable card medium comprising:

an accepting mechanism to accept the application processing request from the host apparatus;

an area control mechanism to extract an area of the memory for processing corresponding to the application processing request accepted by the accepting mechanism, and request the executing mechanism to perform the processing in the extracted area; and an area monitoring mechanism to take as input information of an area having access during the execution of the program in the executing mechanism, and monitor whether or not the processing in the executing mechanism is being performed in the area extracted by the area control mechanism.

2. A portable card medium according to claim 1, wherein the area control mechanism comprises an area table previously containing area information used for performing the processing in the executing mechanism according to the type of application processing, and refers to the area table according to the type of application processing request accepted by the accepting mechanism, thereby extracting an area of the memory for processing corresponding to the application processing request.

3. A portable card medium according to claim 2, wherein the area table can be configured to set an area corresponding to an access space for storage of data used for the application accepted by the accepting mechanism and for the operation of an access control in the program, and an area corresponding to a command space for the operation of a command used for processing other than the access control in the program.

4. A portable card medium according to claim 2, wherein the area control mechanism is configured to extract the area of the memory for the processing corresponding to the application processing request accepted by the accepting mechanism depending upon address information or page information by referring to the area table.

5. A portable card medium according to claim 2, wherein the area monitoring mechanism comprises a register portion containing the area of the memory extracted by the area control mechanism, and is configured to monitor whether or not the processing in the executing mechanism is being performed depending upon information stored in the register portion.

6. A portable card medium according to claim 2, wherein the area table contains, for each type of the application processing request from the host apparatus, authentication information used to decide whether or not the application processing request can be accepted.

7. A portable card medium according to claim 2, wherein the area control mechanism stores, in the area table, identification information used for identification of the application processing, and contained in the preceding application processing request accepted by the accepting mechanism.

8. In a method for managing a memory space of a portable card medium in which a memory contains a plurality of programs to be executed in response to various application processing requests from a host apparatus and data used for execution of the programs, and the programs are executed in the executing mechanism depending upon the stored programs and data, thereby processing a desired application processing request from the host apparatus, the method for managing the memory space of the portable card medium comprising the steps of:

setting, corresponding to an area of the memory, an access space for storage of data used by the application and for the operation of an access control in the program, a command space for the operation of a command used for processing other than the access control in the program, and a supervisory control space for a supervisory control of the processing in the access space and the command space; and when a processing request from the host apparatus is accepted in the supervisory control space, transferring the operation from the supervisory control space to the access space or the command space such that the executing mechanism can process the processing request.

9. A method for managing a memory space of a portable card medium according to claim 8, wherein, for a plurality of application processing, the memory can contain the programs for the plurality of application processing and the data used for execution of the programs, while the access space and the command space can be set for each application.

10. A method for managing a memory space of a portable card medium according to claim 9, wherein an area for accessible data and an area for a program allowing an access control can be set in the access space according to division for each of the applications.

11. A method for managing a memory space of a portable card medium according to claim 10, wherein a part of the access space set according to division for each of the applications is defined as a mutually shared space.

12. A method for managing a memory space of a portable card medium according to claim 9, wherein a program area in which command execution is enabled can be set in the command space according to division in application units.

13. A method for managing a memory space of a portable card medium according to claim 12, wherein a part of the command space set according to division for each of the applications is defined as a mutually shared space.

14. A method for managing a memory space of a portable card medium according to claim 8, wherein the command space is extended depending upon a declaration made to the supervisory control space while the command space is active.

15. A method for issuing a portable card medium comprising:

when the portable card medium is issued in which a memory contains a plurality of programs to be executed in response to various application processing requests from the host apparatus and data used for execution of the programs, and the programs are executed in the executing mechanism depending upon the stored programs and data, thereby processing a desired application processing request from the host apparatus, an authentication information posting step of posting authentication information inherent in the host apparatus capable of issuing the card medium to an external card medium containing authentication information;

a collation decision step of, in the external card medium, collating for authentication the authentication information posted in the authentication information posting step with the authentication information stored in the external card medium, and deciding whether or not the card medium can be issued through the host apparatus; and an issuing step of issuing the desired card medium through the host apparatus when it is decided that the card medium can be issued as a result of decision in the collation decision step.

16. A method for writing program data on a portable card medium comprising:

when an external apparatus writes program data on the memory of the portable card medium in which the memory contains a plurality of programs to be executed in response to various application processing requests from the host apparatus and data used for execution of the programs, and the programs are executed in the executing mechanism depending upon the stored programs and data, thereby processing the desired application processing request from the host apparatus, an authentication information posting step of posting authentication information of the external apparatus to the card medium, and posting authentication information of the card medium to the external apparatus;

a collation decision step of, in the external apparatus, collating for authentication the authentication information posted from the card medium with the authentication information stored in the external apparatus, and, in the card medium, collating for authentication the authentication information posted from the external apparatus with the authentication information stored in the card medium, thereby deciding whether a write operation of the program data by the external apparatus is to be enabled or disabled; and a write operation step of, in the card medium, performing the write operation through the external apparatus when it is decided that the program data can be written as a result of decision in the collation decision step.

17. A computer readable recording medium with a memory space management program recorded therein comprising the memory space management program recorded for, when a memory space is managed in a computer in which a memory contains a plurality of programs to be executed in response to various application processing requests from a host apparatus along with data used for execution of the programs and the programs are executed in an executing mechanism depending upon the stored programs and data, thereby processing the desired application processing request from the host apparatus, causing the computer to realize:

a space setting function of setting in an area of the memory an access space for storage of data used by the application and for the operation of an access control in the program, a command space for the operation of a command for processing other than the access control in the program, and a supervisory control space for a supervisory control of processing in the access space and the command space; and a space control function of transferring, when a processing request from the host apparatus is accepted in the supervisory control space, the operation from the supervisory control space to the access space or the command space such that the executing mechanism can process the processing request.

* * * * *

UNITED STATES PATENT AND TRADEMARK OFFICE
CERTIFICATE OF CORRECTION

PATENT NO. : 6,003,113

DATED : December 14, 1999

INVENTOR(S) : Hoshino

It is certified that error appears in the above-identified patent and that said Letters Patent is hereby corrected as shown below:

Title Page, Item [54]

and col. 1 please delete, " PORTABLE CARD MEDIUM, METHOD FOR MANAGING MEMORY SPACE OF PORTABLE CARD MEDIUM " and insert therefor, -- PORTABLE CARD MEDIUM, METHOD FOR MANAGING MEMORY SPACE OF PORTABLE CARD MEDIUM, METHOD FOR ISSUING PORTABLE CARD MEDIUM, METHOD FOR WRITING PROGRAM DATA ON PORTABLE CARD MEDIUM, AND COMPUTER READABLE RECORDING MEDIUM WITH MEMORY SPACE MANAGEMENT PROGRAM RECORDED THEREIN --

Signed and Sealed this

Fifth Day of December, 2000

Attest:

Q. TODD DICKINSON

*Attesting Officer*     *Director of Patents and Trademarks*